US006892655B2

(12) United States Patent  
Nunemacher

(10) Patent No.: US 6,892,655 B2
(45) Date of Patent: May 17, 2005

(54) DRUM TRANSPORT DEVICE

(75) Inventor: Robert C. Nunemacher, Palmyra, MO (US)

(73) Assignee: Continental Cement Company, LLC, Hannibal, MO (US)

( * ) Notice: Subject to any disclaimer, the term of this patent is extended or adjusted under 35 U.S.C. 154(b) by 112 days.

(21) Appl. No.: 10/254,733

(22) Filed: Sep. 25, 2002

(65) Prior Publication Data

US 2004/0055518 A1 Mar. 25, 2004

(51) Int. Cl.[7] ................................................. F23B 7/00
(52) U.S. Cl. .................. 110/267; 110/101 R; 110/229; 110/233; 110/341
(58) Field of Search ................................ 110/267, 289, 110/290, 101 R, 229, 233, 341, 342; 198/742, 745

(56) References Cited

U.S. PATENT DOCUMENTS

| | | | |
|---|---|---|---|
| 3,163,134 A | * | 12/1964 | Dicus ........................ 110/346 |
| 3,796,300 A | * | 3/1974 | Hudson ...................... 198/745 |
| 4,136,624 A | * | 1/1979 | Kato et al. .................. 110/236 |
| 4,184,581 A | | 1/1980 | Crawshay et al. |
| 4,203,493 A | | 5/1980 | Miller |
| 4,223,775 A | | 9/1980 | Lloyd |
| 4,678,514 A | | 7/1987 | Deyhle et al. |
| 4,797,091 A | | 1/1989 | Neumann |
| 4,834,914 A | | 5/1989 | Jackson |
| 4,852,392 A | | 8/1989 | Evans |
| 4,891,082 A | | 1/1990 | Broyles et al. |
| 4,898,615 A | | 2/1990 | Trivino Vazquez et al. |
| 5,040,972 A | | 8/1991 | Kleinhenz et al. |
| 5,122,189 A | | 6/1992 | Garrett et al. |
| 5,123,364 A | | 6/1992 | Gitman et al. |
| 5,156,676 A | | 10/1992 | Garrett et al. |
| 5,349,910 A | | 9/1994 | Hundebol |
| 5,410,121 A | | 4/1995 | Schlienger |
| 5,532,448 A | | 7/1996 | Schlienger |
| 5,667,057 A | * | 9/1997 | Randall et al. ............. 198/742 |
| 5,989,017 A | | 11/1999 | Evans |
| 6,045,070 A | | 4/2000 | Davenport |
| 6,203,765 B1 | | 3/2001 | Taciuk et al. |
| 6,210,154 B1 | | 4/2001 | Evans et al. |
| 6,213,764 B1 | | 4/2001 | Evans |
| 6,345,981 B1 | | 2/2002 | Hansen et al. |

* cited by examiner

Primary Examiner—Kenneth Rinehart
(74) Attorney, Agent, or Firm—Armstrong Teasdale LLP

(57) ABSTRACT

A drum transport device is disclosed which includes a plate, a first and a second pair of connected and vertically spaced horizontal bars a pair on opposite sides of the row of drums. Each bar has an end which is connected to the plate. The device includes middle horizontal bars, a first between the first pair of horizontal bars and a second between the second pair. The middle horizontal bars move in unison with one another and to move relative to the first and second pair bars. The device also includes a plurality of vertically oriented hinge doors, pivotably connected to the horizontal bars. Tie rods are pivotably connected to both the hinge doors and a corresponding middle horizontal bar, such that when a middle bar is moved relative the pairs of horizontal bars, the hinge doors swing to a position substantially parallel to or substantially parallel to the bars.

9 Claims, 21 Drawing Sheets

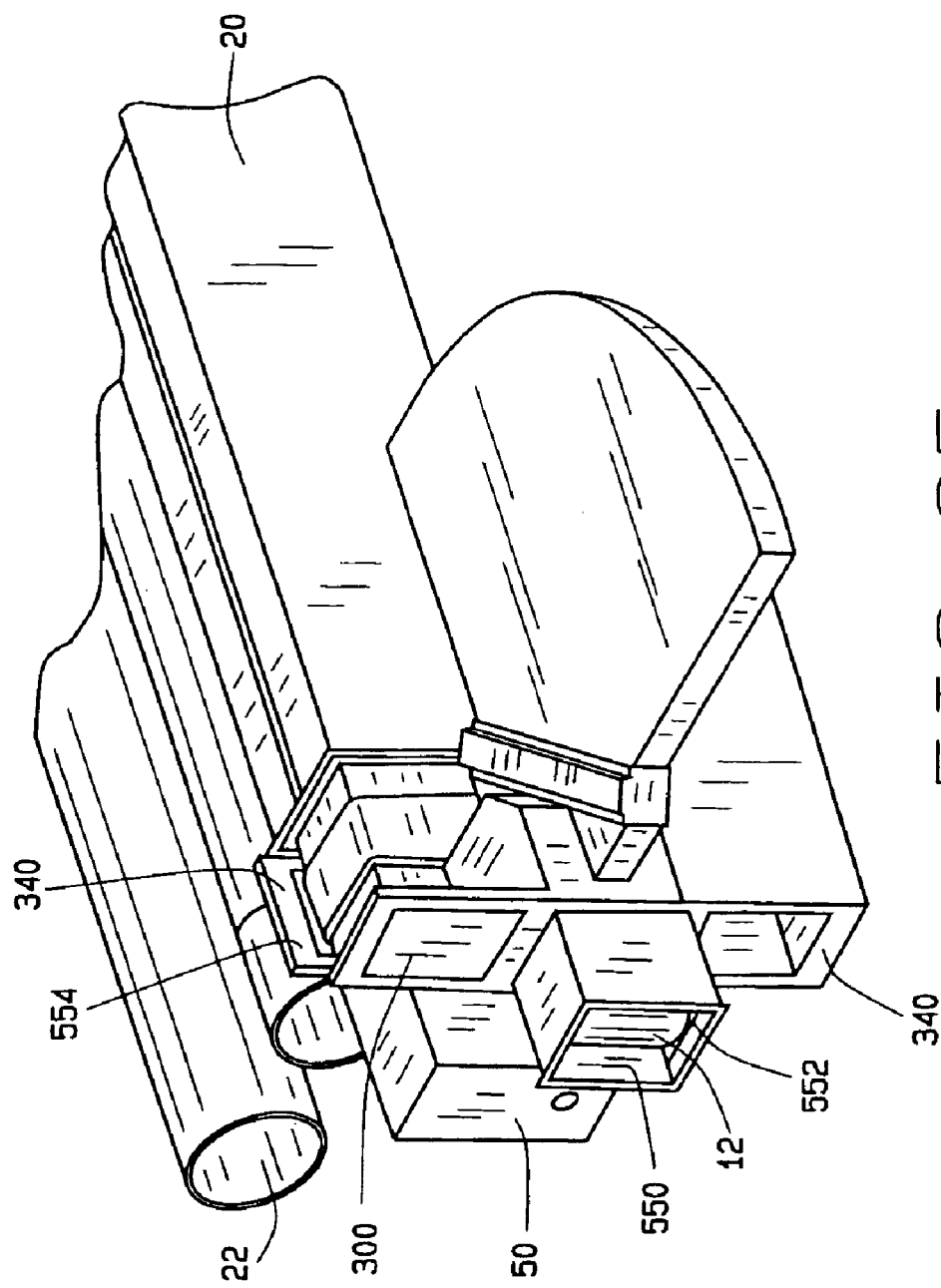

DRUM TRANSPORT DEVICE

BACKGROUND OF THE INVENTION

This invention relates generally to waste pyrolysis, and more specifically to, movement of drums of waste materials through a pyrolysis system.

Several drum processing applications, for example, those which include pyrolysis of waste material in drums, subject the drums or the contents of the drums to an environment containing inert or reactive gasses, high or low temperatures, high pressure liquid washing, or radiation in combination with these conditions. Certain of these drum processing applications involve transportation of the drums through extremely dirty and dusty environments. Many of these drum processing applications utilize a high reliability seal between a processing tunnel and a drum transporter drive mechanism. As used herein, a drum is considered to be a container for holding waste, for example, a 55 gallon barrel. Pyrolysis, as used herein, is a decomposition or transformation of a compound caused by heat.

For cleaner, milder temperature, and non-corrosive gas drum processing applications, it is sufficient to use standard roller conveyers, moving conveyor belts, or chains. In other applications, steel cables are utilized to move drums through processing tunnels. Unfortunately, in the drum processing applications described above, (i.e. those involving highly destructive or corrosive gasses and/or extremes in temperature) the environmental conditions cause such devices to be highly unreliable or infeasible. Conveyor belts and roller conveyor type devices are not suitable because they jam up when covered with dust. Conveyor belts and roller conveyor type devices also impede heat transfer to drum bottoms or a liquid to be sprayed onto the drum bottoms. Rubber, fabric or polymer belts cannot withstand high temperatures and aggressive gasses. Metallic belts contain many moving parts, which erode, corrode, jam and break. It is also difficult to load drums on and off such belts. In addition the drums can slip on the belts causing jam-ups and costly removal and repair of the whole conveyor unit. Linked metallic belts having lugs to hold the drums reduce this problem, but further increase cost and complexity, and do not diminish problems associated with many moving parts.

Further, drum transport systems such as belts, rollers, or chains typically utilize a horizontal access port in a side of the processing tunnel. Such transport systems have to utilize additional actuators located inside the tunnel to move drums into position on the belt, chain or rollers, for example, an additional belt, roller, or chain transport system. However, actuators inside the tunnel are prone to failure due to the harsh environmental conditions, for example, those conditions found in a pyrolysis system. Lastly, all of these drum transport mechanisms utilize complicated tensioning devices to compensate for large extremes in temperature as which are present within pyrolysis systems.

Drum transporting systems which utilize a cable system could also be used. These cable systems are built with rigid metal bars attached to two horizontally spaced moving cables so that drums between the metal bars are moved along in a line. Unfortunately thermal flexing of the cables is a source of wear and degradation. Additionally, the use of cables typically results in the use of complicated tensioning devices to compensate for the wide temperature extremes associated with a chamber of a pyrolysis system. When the tensioning devices are located outside the pyrolysis chamber, a complicated and failure prone gas seal must be used to allow movement of the drum transport mechanisms. This seal is normally at the same high temperatures as the pyrolysis chamber. Finally, most materials available for constructing flexible cables are not suitable for use in a high temperature pyrolysis environment. For example, stainless steel, which contains nickel, becomes corroded by sulfur contact at 1200 degrees Fahrenheit, making it unsuitable for cable construction.

In addition, horizontal drum transport devices such as belts, rollers, chains, cables, or trolleys, only apply force to the drum at one location, which is usually at the bottom of the drum. In such cases, the drums could easily tip over if small horizontal forces opposite the force of the drum transport device are applied to the top of the drum. In certain known pyrolysis systems, carbonaceous accumulations on the walls or ceiling of the pyrolysis chamber can cause such undesirable and costly tipping.

BRIEF DESCRIPTION OF THE INVENTION

In one aspect a drum transport device for transporting rows of drums of material through a processing tunnel is described. The device comprises a plate, a first pair of connected and vertically spaced horizontal bars on a first side of the row of drums, and a second pair of connected and vertically spaced horizontal bars on an opposite side of the row of drums. Each of the bars comprises an end, and each end is connected to the plate. The device further comprises a plurality of middle horizontal bars, one between the first pair of horizontal bars and one between the second pair of horizontal bars. The middle horizontal bars move in unison with one another, and are configured to move relative to said first pair and said second pair of horizontal bars. The device also comprises a plurality of vertically oriented hinge doors, a first plurality pivotably connected to the first pair of horizontal bars and a second plurality pivotably connected to the second pair of horizontal bars. A plurality of tie rods are pivotably connected at a first end to the hinge doors and pivotably connected at a second end to a corresponding middle horizontal bar, such that when the middle bar is moved relative to the first pair and the second pair of horizontal bars, the hinge doors swing to a position either substantially parallel to the horizontal bars or substantially perpendicular to the horizontal bars.

In another aspect, a device for transporting rows of drums is provided, where the device comprises a fixed end plate comprising a plurality of holes therethrough and a plurality of hydraulic cylinders mounted to the fixed end plate and configured to operate through the holes. The device further comprises a first plate and a second plate each comprising a first end and a second end, and at least one hydraulic cylinder is attached to each plate allowing the first plate to move relative to the fixed end plate and the second plate to move relative to the fixed end plate and the first plate. The device also comprises a first pair of vertically spaced horizontal bars attached to the first end of the first plate, a second pair of vertically spaced horizontal bars attached to the second end of the first plate, a first middle horizontal bar between the first pair of vertically spaced horizontal bars and attached to the first end of the second plate and a second middle horizontal bar between the second pair of vertically spaced horizontal bars and attached to the second end of the second plate. A plurality of vertically oriented hinge doors, a first plurality pivotably connected to the first pair of vertically spaced horizontal bars and a second plurality pivotably connected to the second pair of vertically spaced horizontal bars are also part of the device which also comprises a plurality of tie rods pivotably between the hinge doors and a respective middle horizontal bar. In operation, when the second plate is moved relative to the first plate, the hinge doors swing to a position substantially parallel to the bars or to a position substantially perpendicular to the bars.

In still another aspect a pyrolysis chamber is provided which comprises a rectangular metallic duct, at least one hot air jacket section surrounding the metallic duct, and a heat transfer source which utilizes exhaust gases from a cement kiln to externally heat an area between the duct and the jacket sections. The chamber further comprises an exhaust for pyrolysis gases created in the chamber, the exhaust configured to provide heat to the cement kiln and a drum transport device for transporting a row of drums of waste material through the pyrolysis chamber.

In yet another aspect, a method for moving drums along through a pyrolysis chamber is provided. The chamber includes a drum transport device which includes two sets of vertically spaced horizontal bars, one set on each side of a row of drums, and a plurality of vertically oriented hinge doors. A number of the doors are pivotably connected at intervals to a top and bottom bar of one set of bars, and a number of the doors are pivotably connected at intervals to a top and bottom bar of the other set of bars. The drum transport device further includes a plurality of tie rods pivotably connected between the hinge doors and a respective middle horizontal bar. The method comprises moving the middle bars with respect to the top and bottom bars such that the hinge doors swing to a position substantially perpendicular to the horizontal bars and moving the sets of bars in unison, in a first direction, until the doors engage the drums. The method continues by moving the sets of bars, and therefore the drums, in the first direction until the drums are in a desired position, moving the middle bars with respect to the top and bottom bars such that the hinge doors swing to a position substantially parallel to the horizontal bars, and moving the sets of bars in unison in a second direction until a pair of hinge doors are in a position to engage a newly inserted drum upon movement to the substantially perpendicular position.

BRIEF DESCRIPTION OF THE DRAWINGS

FIG. 25 is another embodiment of a pyrolysis system utilizing the gas tight door of FIGS. 13–23.

DETAILED DESCRIPTION OF THE INVENTION

Figure 1:
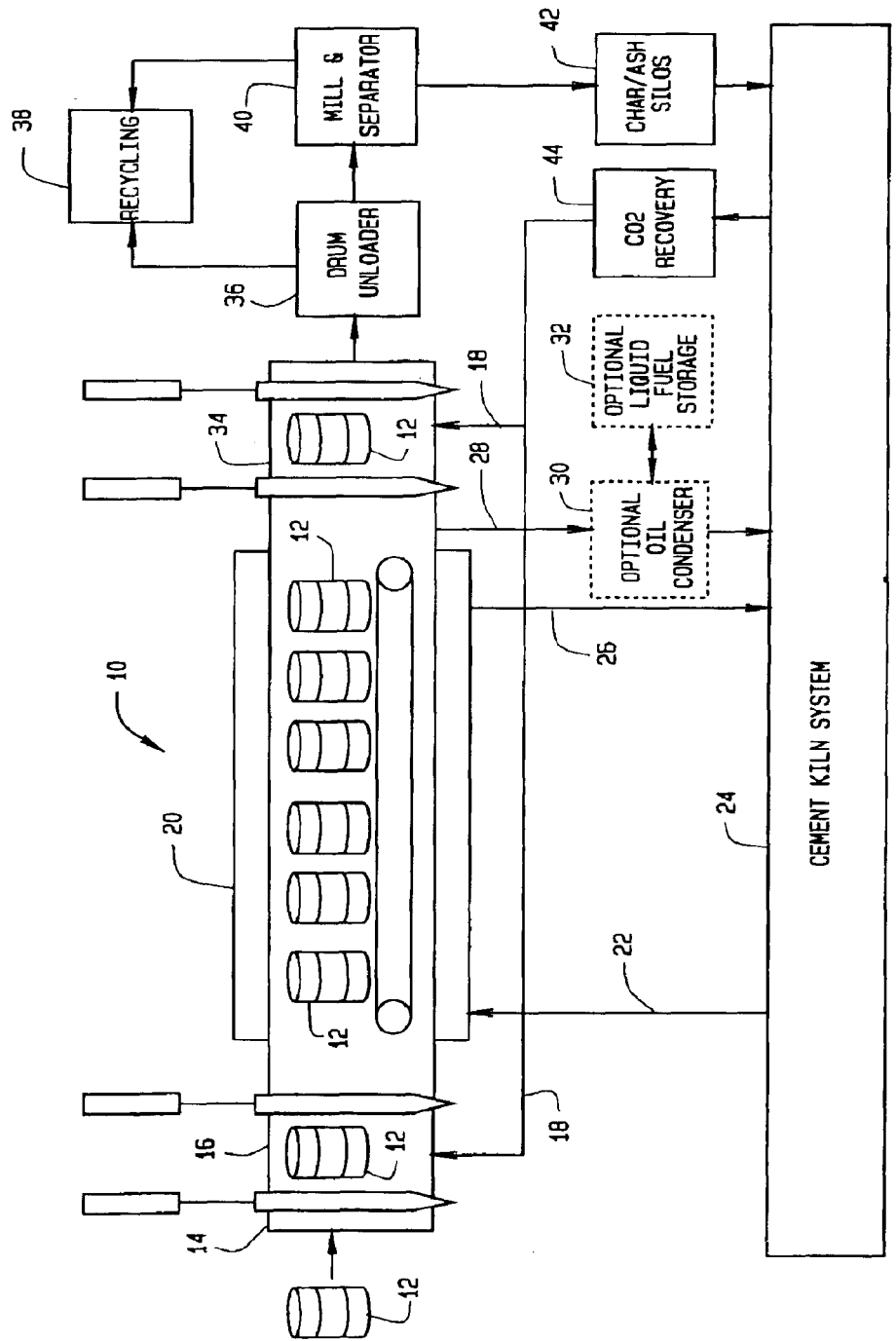
FIG. 1 is a block diagram of a cement kiln utilizing an integrated pyrolysis process.

FIG. 1 is a diagram of a pyrolysis system 10 configured to perform an integrated pyrolysis process. System 10, in the embodiment shown, includes a number of different sections. Waste feed drums 12 enter a first section 14 and cement plant raw materials, fuels, and metal products exit in latter sections as further described below. Specifically, in first section 14 lids (not shown) are removed from drums 12 of waste. For waste recycling operations it is desirable to have a process that accepts, for example, whole 55-gallon shipping drums of solid, semisolid, or liquid waste, and does not require drums 12 to be emptied beforehand. The integrated pyrolysis process described herein with respect to pyrolysis system 10 accepts whole drums of solid, semisolid, or liquid waste, and in one embodiment, transforms waste encrusted drums into clean recyclable steel.

In a feed inerting section 16 drums 12 enter a sealed chamber via sliding doors where carbon dioxide 18 recovered from the cement kiln replaces oxygen to provide a substantially oxygen free environment. Pyrolysis occurs when drums 12 of waste are slowly transported through a pyrolysis reactor 20. Hot exhaust gasses 22 from cement kiln 24 heat pyrolysis reactor 20 externally. Pyrolysis fuel gas 26 created from pyrolyzing the waste exits pyrolysis reactor 20 where it can be burned directly to provide heat to kiln 24.

Heat is transferred from hot cement kiln exhaust gases 22, through a metallic wall of pyrolysis reactor 20, then to walls of steel drums 12 and finally to the waste. Therefore, solid waste is not in contact with the hot metallic wall of pyrolysis reactor 20, but only in contact with a heated steel drum 12. Corrosion and erosion of steel drums 12 is not a problem since drums 12 are recycled for scrap steel at the end of the process.

Efficiency and integrity of pyrolysis reactor 20 is not affected by such costly and troublesome corrosion, as is the case in known pyrolysis devices. In such devices, moving waste is in direct contact with heated walls of the pyrolysis chamber. The walls of these devices are therefore subject to significant erosion, deleterious corrosion, and damaging thermal stresses. These devices therefore utilize more specialized and costly metallic alloy heat transfer surfaces.

In an alternative embodiment, rather than being burned directly to provide heat to kiln 24 as fuel gas 26 is, pyrolysis fuel gas 28 is sent to a fuel oil section 30, where the gases are condensed into a fuel oil and stored in cement kiln liquid fuel tanks 32. Drums 12 exiting pyrolysis reactor 20 enter a product inerting section 34. Gases resulting from pyrolysis are removed from drums 12 in product inerting section 34 and replaced with carbon dioxide gas 18. Gases exiting product inerting section 34 are combined with cement kiln fuel gas. Drums 12 then exit product inerting section 34 to a drum unloader section 36, where char/ash and metals are removed from drums 12, and drums 12 are removed for recycling 38. Waste processed by the integrated pyrolysis process results in a larger and more desirable yield of char. Further, the integrated pyrolysis process produces a high BTU value fuel gas, allows easy metals recovery, and can use waste heat from cement kiln 24. Also, the integrated pyrolysis process operates at relatively low temperatures requiring less specialized construction, and does not require waste preprocessing.

The char/ash and metals then drop into a processing section 40 where the char/ash is pulverized then freed from the metal, in one embodiment, utilizing a tumbling mill. Since the metal is isolated from the char/ash, it can be recycled 38 by traditional processes. In a blending section 42, the char/ash is blended in a large hopper or silo whereupon it is ready to be analyzed and used as either or both of a raw material for cement making and a fuel in cement kiln 24. Carbon dioxide gas 44 from an exhaust stream of cement kiln 24 is recovered to use as an inerting gas in feed inerting section 16 and product inerting section 34.

Char/ash resulting from pyrolyzing the solid waste in pyrolysis system 10 is easy to blend, easy to analyze, and easy to store as a result of the above described process, making it highly suitable for use in the cement making process. A portion of waste solids that are not vaporized during pyrolysis are the most difficult to handle in known cement kiln processes since those solids contain components that change the composition of a cement clinker. However, by transforming this portion into a non-volatile, finely divided, and flowable solid, better separation, recycling, and storage is provided. System 10 also allows the char/ash to become a raw material rather than just a fuel. In addition, component separation in the integrated pyrolysis process carried out utilizing system 10 results in more efficient and deterministic separation of metals from the waste. In one embodiment, tumbling mill processing section 40 is an air swept tumbler mill system which is utilized to grind the char/ash, separate the char/ash from the metals, and further separate the char/ash into a char rich and an ash rich stream.

Pyrolysis system 10 (shown in FIG. 1) therefore provides a continuous waste pyrolysis process where waste materials to be pyrolyzed are moved through system 10 in drums 12 and inerting carbon dioxide gas 18 for the process is supplied by cement kiln 24. Waste heat 22 from cement kiln 24 is used to provide energy for the pyrolysis. Therefore, pyrolysis system 10 and the processes embodied therein are acceptable for pyrolyzing, without pretreatment, a large range of liquids, sludge, and solids, including materials that have high and low density, are stringy, or materials containing large fractions of metal objects. As a result, pyrolysis system 10 requires less contact between the waste and plant personnel since drums 12 of waste do not need to be emptied, as is done in known pyrolysis systems. In addition, system 10 therefore does not need to be constructed utilizing specialized materials as is utilized in other gasification and pyrolysis processes.

Figure 2:
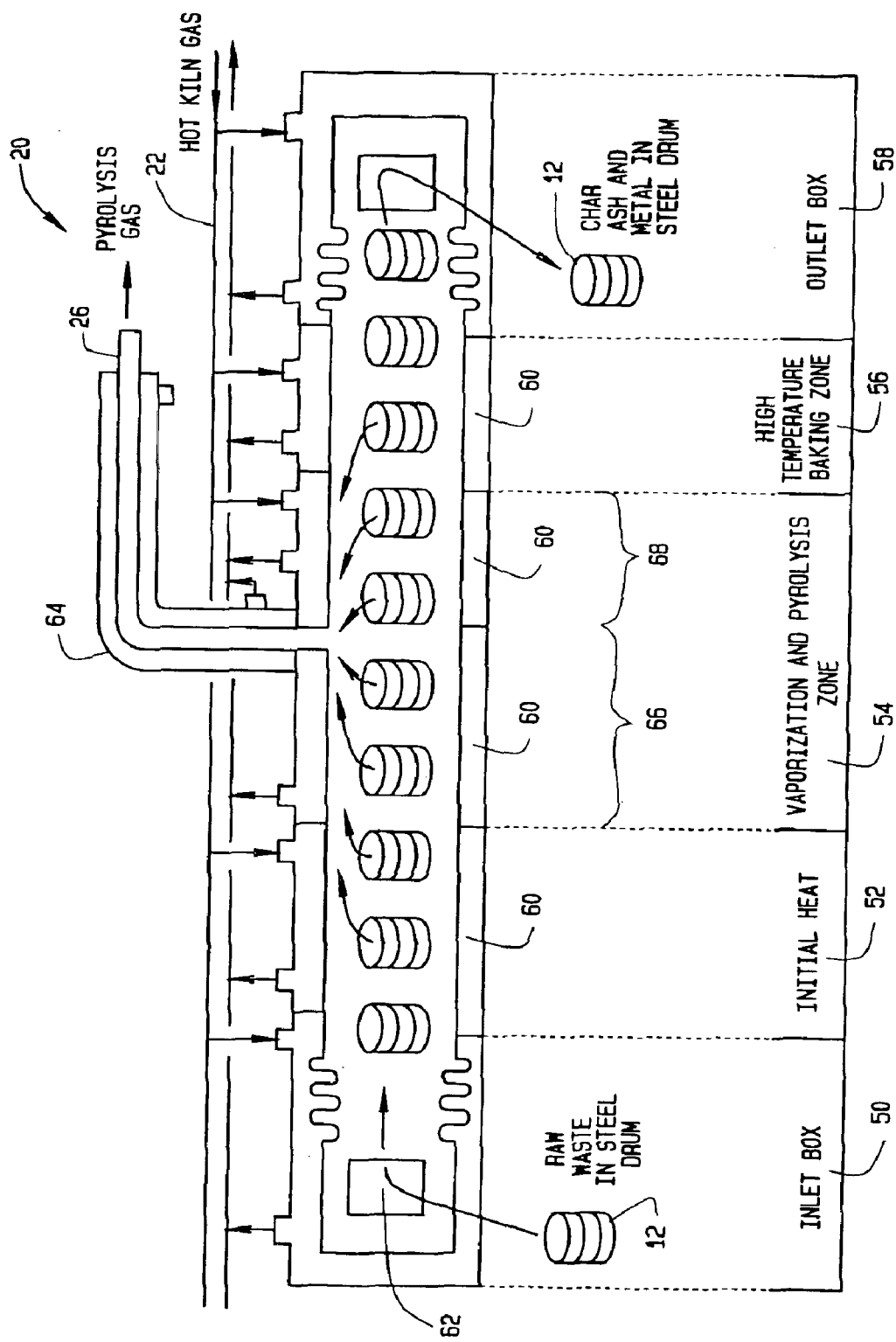
FIG. 2 is a functional view of a pyrolysis chamber.

FIG. 2 is a functional view of pyrolysis chamber 20. Chamber 20 includes an inlet section 50, an initial heat zone 52, a pyrolysis zone 54, a high temperature baking zone 56, and an outlet section 58. As drums 12 of solid waste progress through pyrolysis chamber 20, for example, at initial heat zone 52, many solid waste components melt. The melt is often highly corrosive, and will typically remain at a constant temperature which is much cooler than walls 60 of pyrolysis chamber 20. The melted liquid waste (not shown) is trapped inside drums 12 until the waste vaporizes and exits pyrolysis chamber 20 as pyrolysis gas 26, typically starting within pyrolysis zone 54 and continuing through high temperature baking zone 56. The melted liquid waste cannot flow towards inlet section 50 or outlet section 58 since it is contained within steel drums 12. Localized cooling occurs at points of contact between the melted liquid waste and steel drums 12, which causes significant thermal stress on drums 12. Such stressing of steel drums 12 is not an issue since drums are recycled for scrap steel at the end of the pyrolysis process.

As described above, functional operation of pyrolysis chamber 20 is divided into three zones, initial heating zone 52 where initial heating before vaporization occurs, pyrolysis zone 54 where vaporization heating occurs, and high temperature baking zone 56. During initial heating, drums 12 are near inlet 50 and have low gas generation, tunnel walls 60 are hotter and a main gas component from the waste is clean purge gas. Therefore in initial heating zone 52, heavy tar pyrolysis vapor is kept away from inlet door 62 and drum transporter connections (not shown). As drums 20 move further down pyrolysis chamber 20 and into pyrolysis zone 54, vaporization begins and tunnel walls 60 transfer more energy to the waste. A pyrolysis gas outlet pipe 64 is located so that it is near a middle of pyrolysis zone 54. In a first half 66 of pyrolysis zone 54, pyrolysis gas flow increases in a direction of drum travel, then as drums 12 pass under outlet pipe 64 and into a second half 68 of pyrolysis zone 54, pyrolysis gas flow becomes counter to the direction of drum travel. Vaporization and pyrolysis diminish as drums 12 enter baking zone 56. In baking zone 56, temperatures of drums 12 rise and vapor composition approaches that of purge gas 22 coming from outlet box 58. It is desirable to maintain drums 12 of char/ash at high temperatures in baking zone 56 to finish baking off all volatile components. Since nearly all pyrolysis gas 26 produced has exited pyrolysis chamber 20 before drums 12 reach baking zone 56, and since any final traces of pyrolysis gas 26 are baked out in baking zone 56, there is little chance for tar vapor to condense in outlet box 58.

Several known pyrolysis processes have the tar laden pyrolysis gas exiting with the char/ash. Therefore when the char/ash is cooled the tar condenses on and around cooler parts of the pyrolysis mechanism. Parts which are cooler than pyrolysis reactor walls include valves, rotary locks and doors. Thus in these known pyrolysis processes tar fouling of such parts becomes a major problem. Baking zone 56 of pyrolysis chamber 20 alleviates such problems since any final traces of pyrolysis gas 26 are baked out.

In addition some known pyrolysis reactors produce low tar export fuel gas by employing conditions that promote tar cracking reactions. Cracked pyrolysis gas can have heating values below 13 $MJ/Nm^3$. Additionally, such cracking reactors require temperatures higher than what is available as waste heat from a cement kiln, thereby requiring pyrolysis gas or a separate fuel be burned to provide the high temperatures. Therefore, a large portion of the energy available in these known reactors is used for cracking and reactor heating, rather than providing energy to a cement kiln. In pyrolysis system 10, substantially all energy from pyrolysis gas 26 is delivered to the cement kiln resulting in higher waste energy utilization and less depletion of natural resources such as coal and oil.

Drums 12 are transported through the drum tunnel, i.e. pyrolysis chamber 20, via any number of mechanisms attached to both inlet box 50 and outlet box 58. The mechanisms include, but are not limited to, drag chain devices with a drag chain extending from inlet box 50 to outlet box 58, or a hydraulic mechanism attached to inlet box 50 that simply pushes drums 12 through pyrolysis chamber 20. Alternatively the mechanism is a drag cable system, which drags drums 20 through pyrolysis chamber 20. Exemplary embodiments of a drum transport device are described below with respect to FIGS. 6–12.

Figure 3:
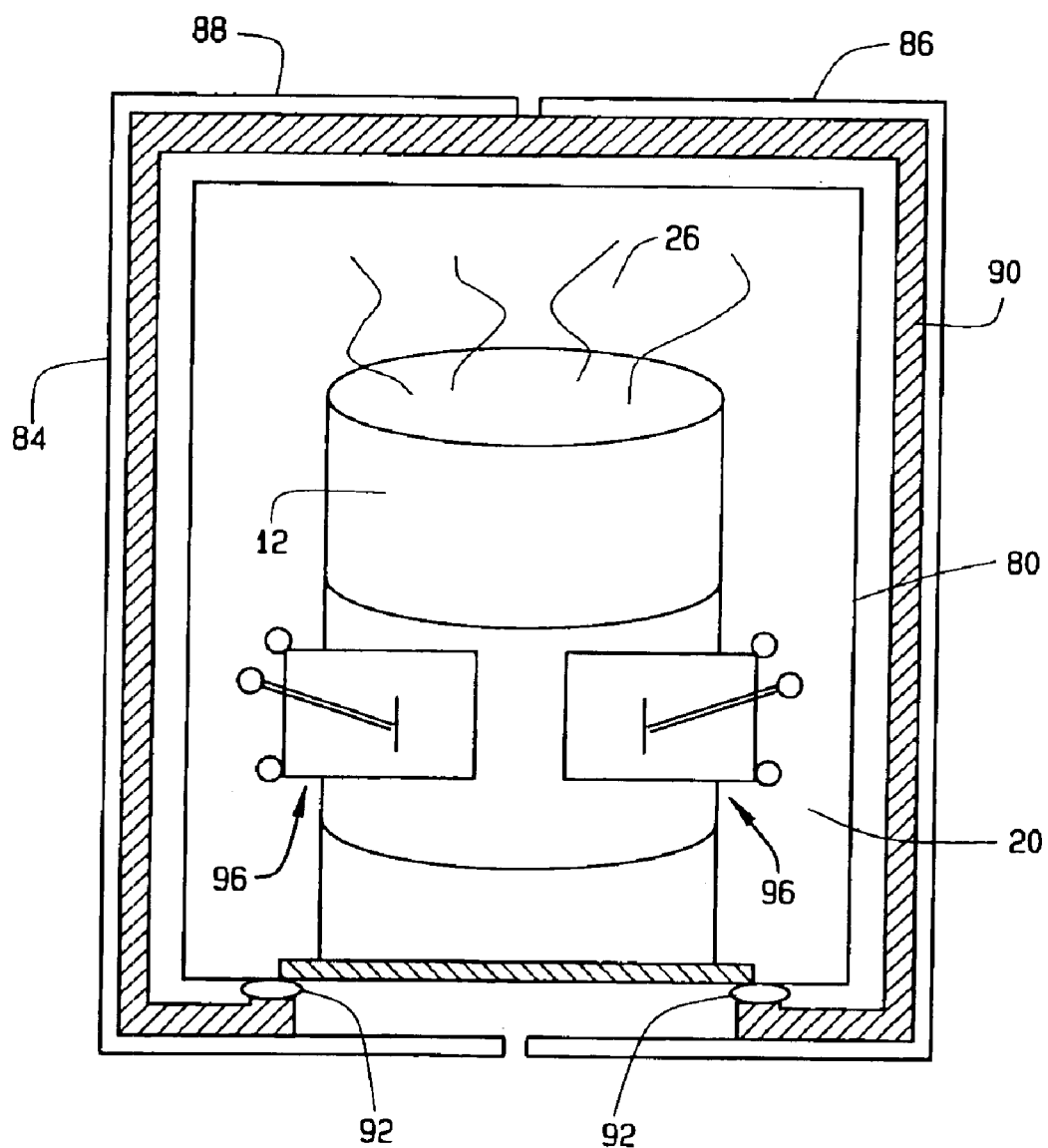
FIG. 3 is a cross-sectional view of a pyrolysis chamber.

FIG. 3 is a cross-sectional view of pyrolysis chamber 20. Pyrolysis chamber 20, in one embodiment, includes a straight rectangular metallic duct 80 slightly wider and slightly taller than a standard 55 gallon drum, for example, drum 12. Duct 80 provides room above drum 12 for pyrolysis gas 26 and vapors to flow from heated drums 12 toward a pyrolysis gas outlet (not shown in FIG. 3). Pyrolysis chamber 20, sometimes referred to as a rectangular drum tunnel, is heated externally via multiple hot air jacket sections 84 which surround metallic duct 80. Each jacket section 84 is composed of two flanged half sections 86 and 88, so that either half section 86, 88 can be removed separately for inspection or repair. Baffles 90 attached to each half section 86, 88 includes shoes 92 which provides support for metallic duct 80 during normal operation. A drum transport device 96 is utilized to move drums 12 through pyrolysis chamber 20 as described in further detail with respect to FIGS. 6–12.

Figure 4:
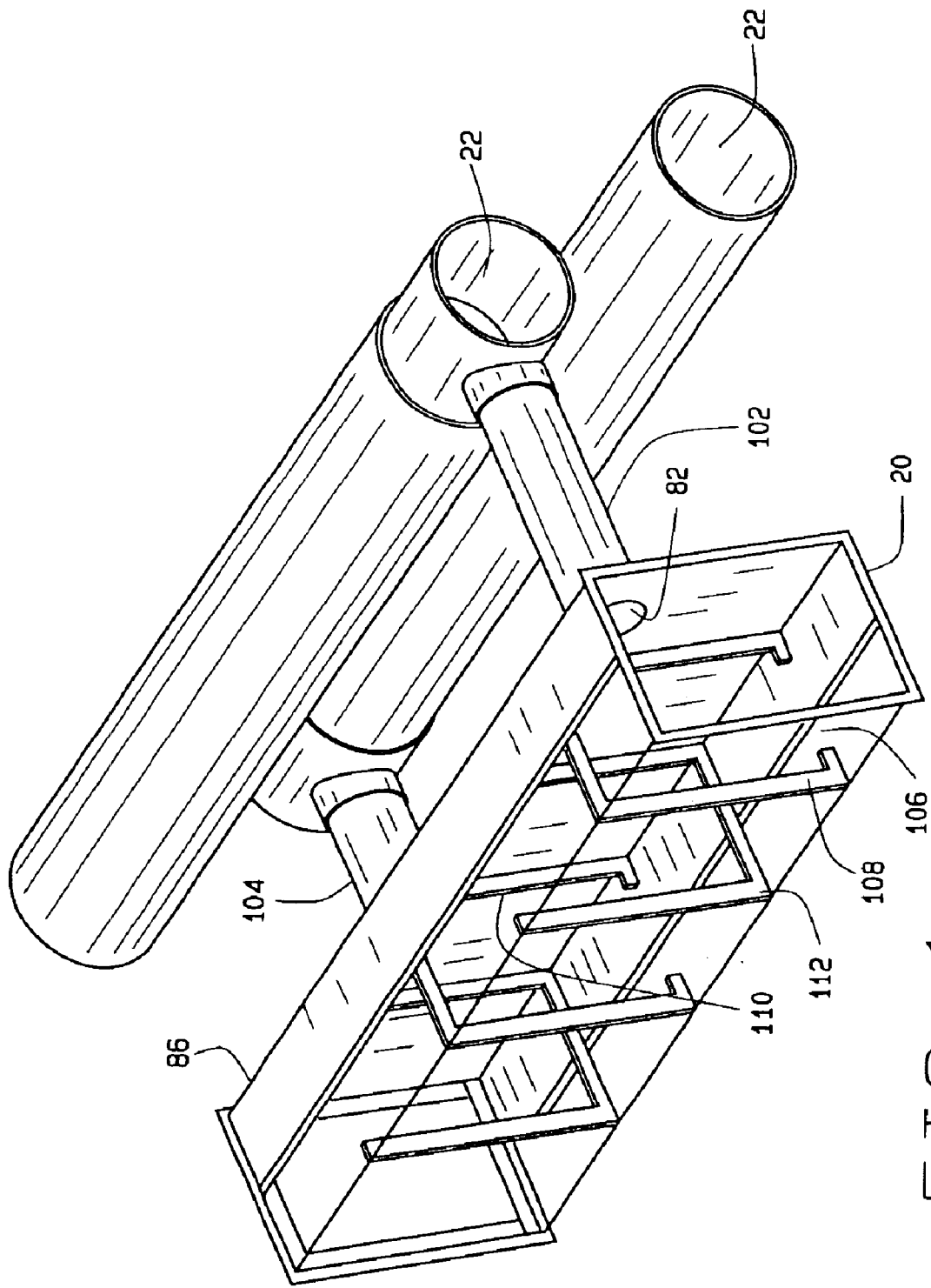
FIG. 4 is a perspective view of the pyrolysis chamber of FIG. 3, showing an inlet pipe and an outlet pipe.

FIG. 4 is a perspective view of a portion of pyrolysis system 10 (shown in FIG. 1). Referring to pyrolysis chamber 20, a jacket section 84 is shown including half section 86. Half section 88, metallic duct 80, and transport device 92 are not shown in FIG. 4 to better illustrate placement of baffles 90. Jacket section 86 contains an inlet pipe 102 and an outlet pipe 104 for the heating air used to heat drums 12. Hot exhaust gas 22 entering jacket section 84 from inlet pipe 102 passes around metallic duct 80 and down through a bottom opening 106 in a first baffle 108, then around metallic duct 80 and through a top opening 110 in a second baffle 112, and so on in a cross flow pattern until hot gasses 22 exit jacket section 84 at outlet pipe 104. Such baffling provides efficient heat transfer between the hot air and metallic duct 80 of pyrolysis chamber 20. A heating air valve (not shown) is utilized in each jacket section 84 and is adjustable to maintain an appropriate temperature within duct 80.

Figure 5:
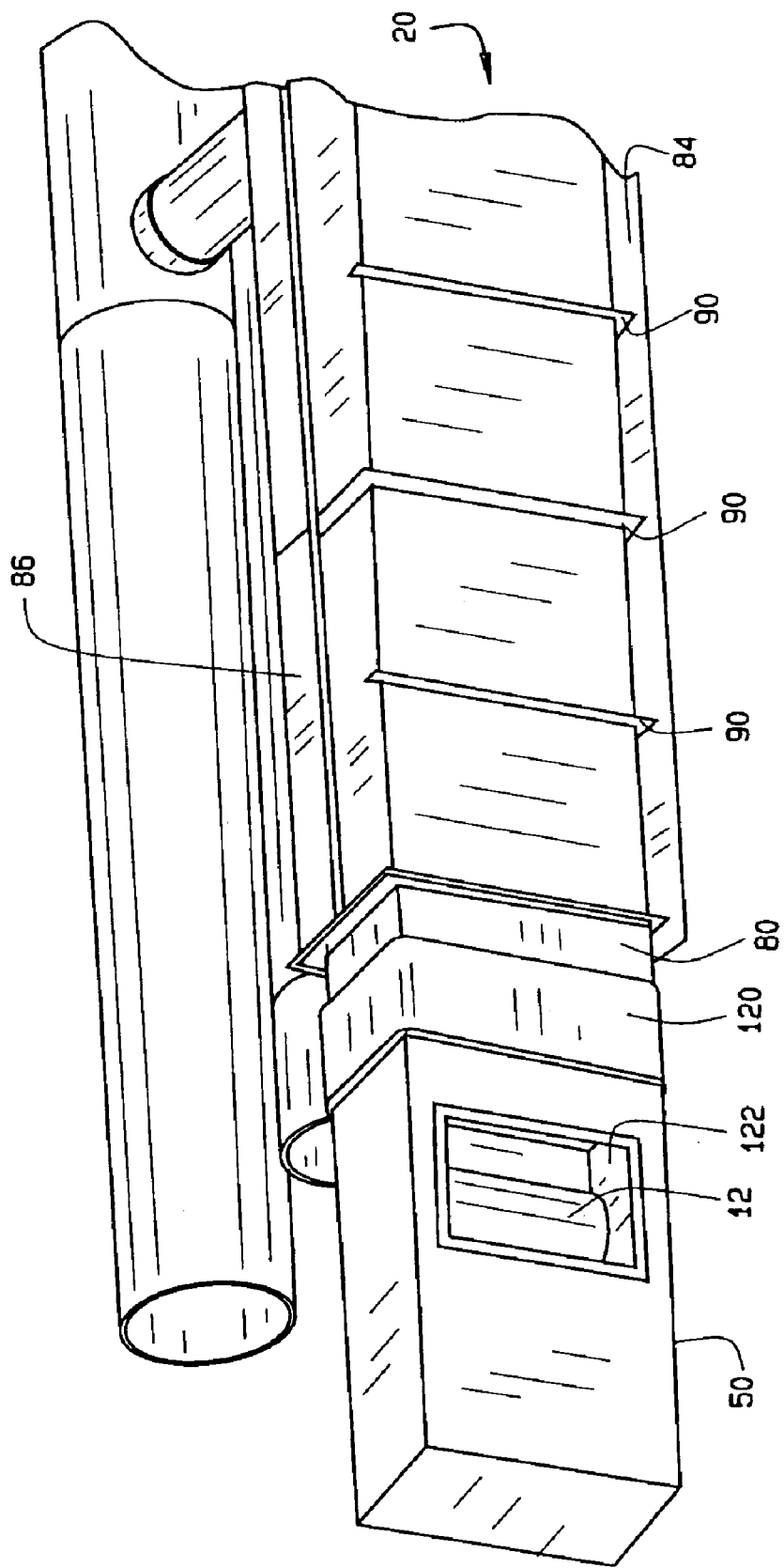
FIG. 5 is a perspective view of the pyrolysis chamber showing an inlet box.

Referring to FIG. 5, a rectangular expansion joint 120 is attached at each end (only one end shown) of metallic duct 80. In the embodiment shown, expansion joint 120 is between inlet box 50 and metallic duct 80. Expansion joints 120 are protected by another set of baffles (not shown) and an inert gas purge while pyrolysis chamber 20 is operating. Inert gas also enters inlet box 50 and outlet box 58 (not shown) in and around drum doors to discourage tar condensation, since parts of the doors operate cooler than the rest of pyrolysis system 10. A drum transport mechanism, for example, one of the mechanisms described above or the drum transport device described in detail below, is attached to inlet box 50 and outlet box 58 for movement of drums 12.

While inlet box 50 is shown having a side opening 124, alternative mechanisms can be implemented for moving drums 12 into inlet box 50. For example, the drum transport device described with respect to FIGS. 6–12 would be operable for drums 12 being inserted into inlet box 50 from either above or below. An exemplary embodiment of a sealing door assembly is described below with respect to FIGS. 13–23. Such an assembly is understood to be operable with inlet box 50 for providing a seal for any of a side opening, such as opening 124, or a top or bottom opening (not shown).

A pyrolysis gas outlet pipe 64 (shown in FIG. 2) is located on metallic duct 80 between the two expansion joints 120. Such a location minimizes any pressure drop due to pyrolysis gas flow and allows pyrolysis gas and inert purge gas to flow concurrent to the pyrolysis gas outlet. This keeps tar laden pyrolysis gas away from the drum inlet and outlet boxes.

Pyrolysis fuel gas 26 typically contains tars and has heating values of 14 to 22 $MJ/Nm^3$. Since the process herein described produces a high energy density gas, it is well suited to cement making processes. The high energy density gas is produced because pyrolysis chamber 20 heats slowly and at relatively low temperatures which are available from cement kiln exhaust gas 22. Pyrolysis gas 26 is kept hot to prevent condensation of the tars, making it unsuitable for storage, transportation through cold piping systems, or suitable for use in engines and boilers. Pyrolysis gas 26 is, however, suitable for cement making processes.

Pyrolysis system 10 is ideally suited to allow reliable cement kiln operation while utilizing a large fraction of solid waste, which is not done with known methods for solid waste processing. Prior art processes prepared the solid waste for the cement kiln by shredding, grinding, addition of dry materials to reduce dripping and sticking of semisolids, and magnetic separation of iron bearing metals. However, it is not practical to reduce particle size of the solid waste to a size that would allow good cement plant burn zone operation. For example it is not practical to reduce waste particles to less than 1 mm. Even if the waste could be ground into fine particles, the particles cannot be blended since they are highly non-uniform and often sticky. For example, finely shredded plastic sheet will not easily blend with sticky resin coated broken glass due to large differences in density and surface area, and stickiness. Due to the non-blendability of such normally processed waste, effects on the cement properties cannot be calculated nor allowed for. The result is that only small quantities are used in known processes to keep from disturbing the qualities of the cement product. When larger normally processed waste particles are blown into the cement kiln burn zone they fall into a clinker where they cause harmful localized reducing, and excessive reducing can degrade cement quality. In practice, solid waste is reduced to a reasonable size and fed in small quantities so that clinkering zone reduction does not become a problem. Pyrolysis system 10 delivers a solid char/ash product with particle sizes typically less than 60 microns. Therefore, the char/ash from pyrolysis system 10 is so uniform and, finely divided that it can be burned at high rates without causing any problems. In addition since the char/ash is blended, any effects on clinker properties can be calculated and allowed for when mixing raw materials for making the cement.

Also, pyrolysis system 10 recovers metals from the raw waste. In the pyrolysis process, metals are loosened from the organic and inorganic waste components during pyrolysis in pyrolysis reactor 20. The metals stay within drum 12 due to the relatively low pyrolysis temperatures, as compared to known gasification processes. Contents of drums 12 are then removed to tumbler mill processing section 40 leaving clean steel drums for recycling. The tumbler mill grinds char/ash into a fine powder and knocks char/ash off the metals leaving them clean. Char/ash and finely divided metals are blown from the tumbler mill to a gas classifier where even the fine metal particles are separated from the char/ash. Large metal pieces blown clean of char/ash are recovered directly from the tumbler mill.

Figure 6:
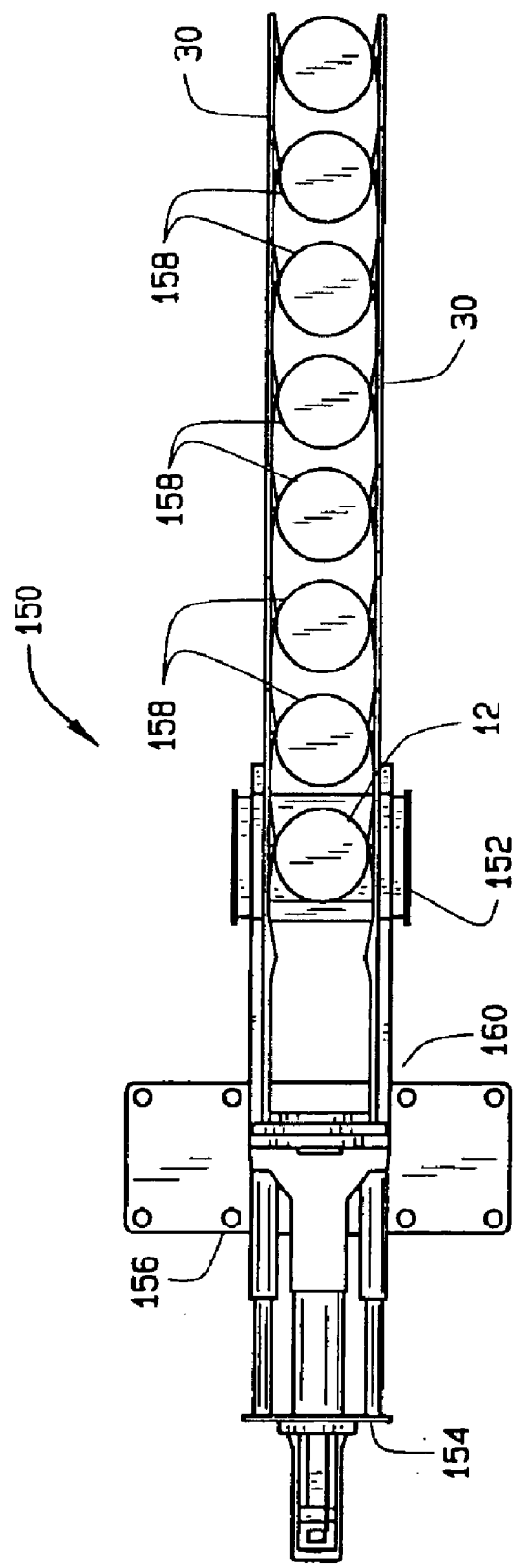
FIG. 6 is a top view of a drum transport device for a pyrolysis system.

FIG. 6 illustrates a top view of a drum transport device 150 utilized to transport drums 12 through the above described pyrolysis system 10 (shown in FIG. 1), including pyrolysis chamber 20. Further illustrated is a first drum 12 being lifted into transport device 150 from below utilizing a lifting surface 152. Drum transport device 150 utilizes a set of hydraulic cylinders 154 attached to a fixed end plate 156. Device 150 utilizes hydraulic cylinders 154 to push or pull first drum 12 and other drums 158 through a processing tunnel, for example, to and from pyrolysis chamber 20 (shown in FIGS. 1,3, and 4) and relative to fixed end plate 156 to which hydraulic cylinders 154 are attached. In one embodiment, fixed end plate 156 includes holes (not shown) through which hydraulic cylinders 154 operate. Drum transport device 150 is capable of transporting drums 12 and 158 in either direction. The hydraulic actuators are located at or near fixed plate 156 which is located at a first end 160 of transport device 150. Actuators are also incorporated at a second end (not shown) to pull drums 12 and 158 toward the second end. The arrangement allows movement of drums 12 and 158 by pulling toward the second end, rather than by pushing from first end 160, within transport device 150.

Figure 7:
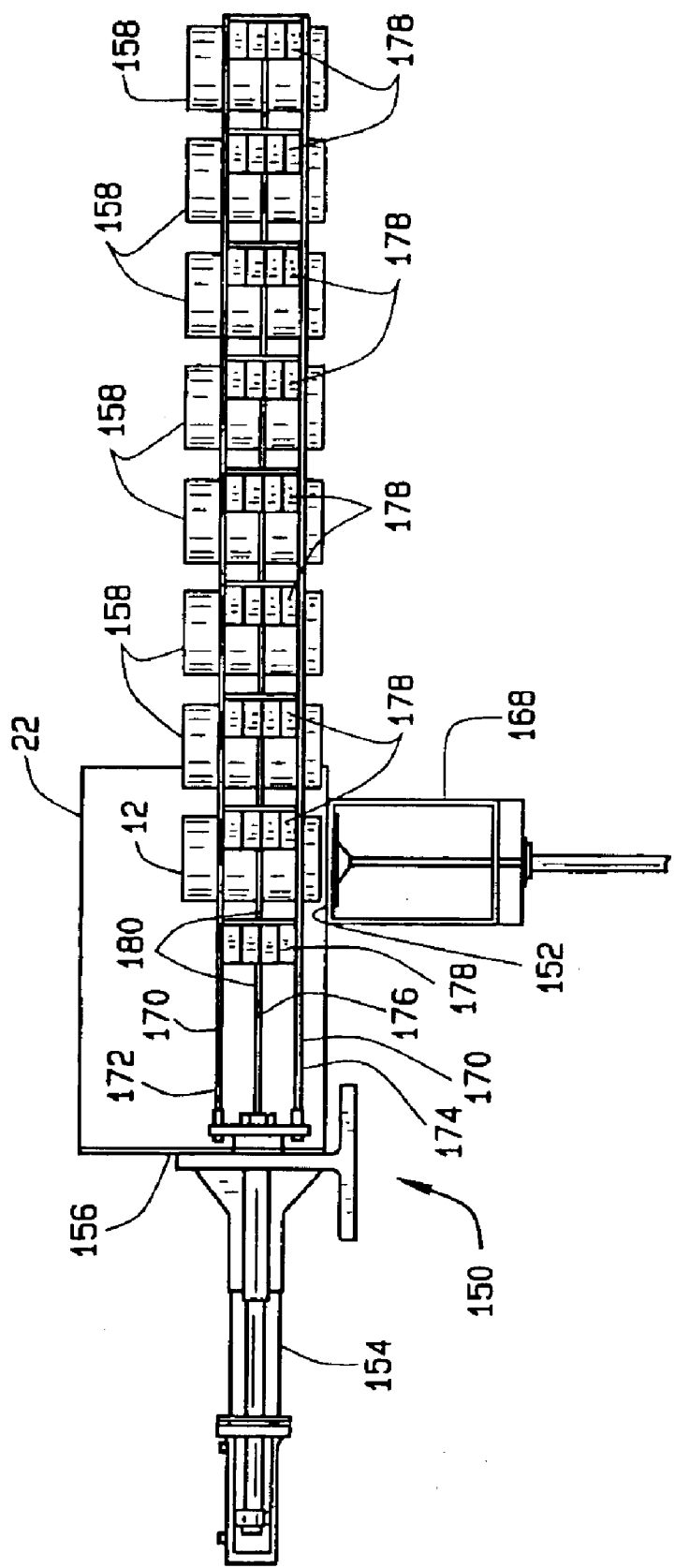
FIG. 7 is a side view of the drum transport device.

FIG. 7 illustrates a side view of drum transport device 150 with drum 12 being lifted into drum transport device 150 (and pyrolysis system 10 (shown in FIG. 1)) from below, utilizing a lift mechanism 168, which incorporates lifting surface 152. Drum transport device 150 includes of a pair of vertically spaced horizontal bars 170, including a top bar 172 and a bottom bar 174, on each side of the row of drums 12 and 158. A third middle horizontal bar 176 is located between each pair of horizontal bars 170. A series of hinge doors 178 are pivotably connected to horizontal bars 170, and a series of tie rods 180 connect hinge doors 178 to middle horizontal bars 176, a first end of tie rods 180 being pivotably attached to hinge doors 178 and a second end of tie rods 180 being pivotably attached to middle horizontal bars 176.

When middle bars 176 are moved in a first direction relative to their respective pair of horizontal bars 170, hinge doors 178 pivot into a space between pairs of horizontal bars 170 and into a line of drums 12 and 158. When middle bars 176 are moved in a second direction relative to their respective pair of horizontal bars 170, hinge doors 178 pivot out of the space between pairs of horizontal bars 170 and out of the line of drums 12 and 158. In one embodiment, relative movement between horizontal bars 170 and middle bars 176 is controlled through hydraulic actuators.

When hinge doors 178 are swung into the line of drums 12 and 158 and all bars 170, 178 are moved together in a single direction, for example, a horizontal direction, the line of drums 12 and 158 is pushed along through processing tunnel 20. Hydraulic cylinders 154 located axially with processing tunnel 20 operate bars 170, 176. As described in further detail below, a first cylinder or plurality of cylinders moves sets of bars 170, 178 located on either side of the row of drums 12 and 158. A second cylinder moves middle bars 178 relative to horizontal bars 170, so that hinge doors 178 are opened or closed.

Figure 8:
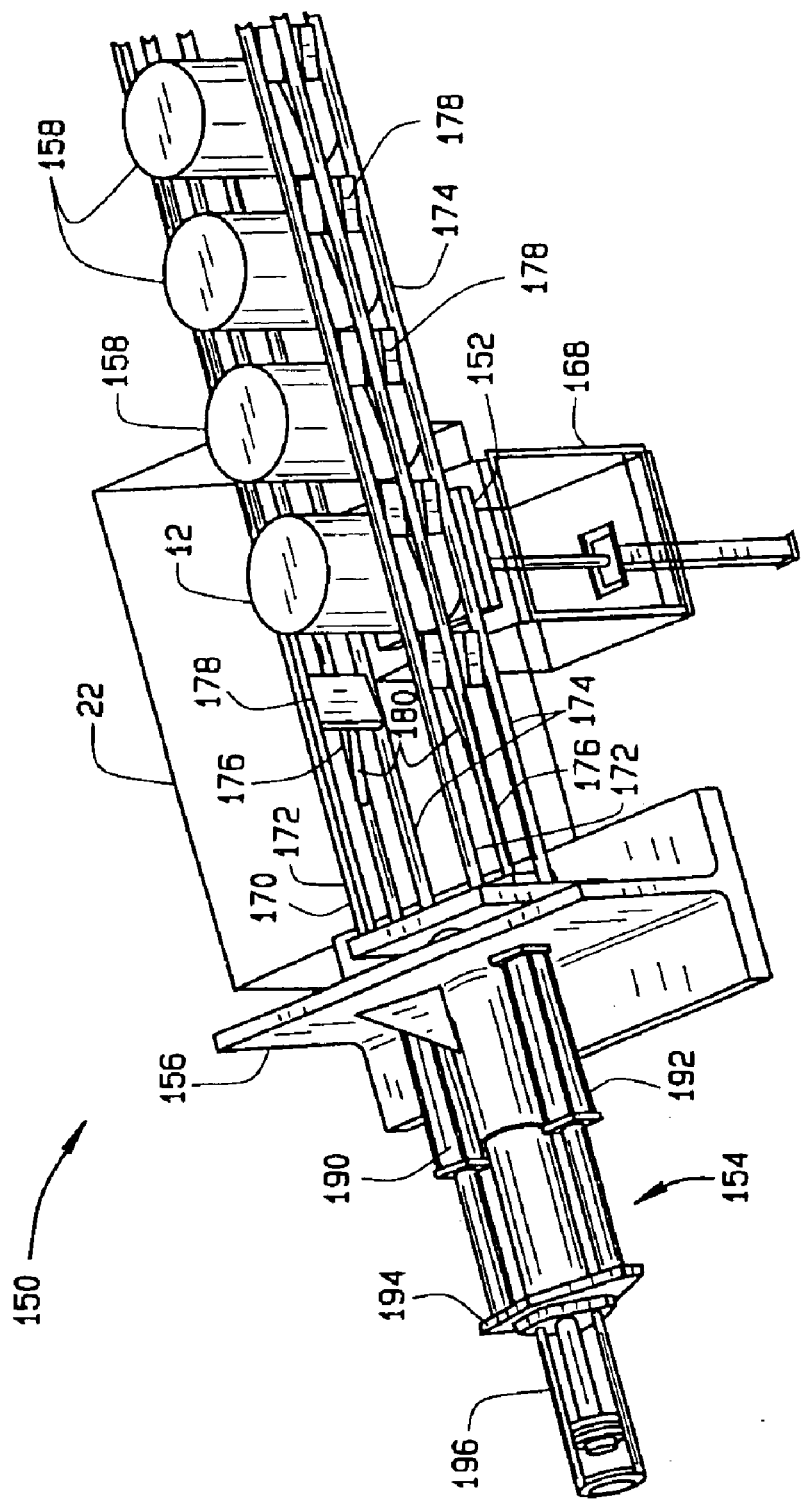
FIG. 8 is a detailed view of a drum loading portion of the drum transport device.

FIG. 8 is a perspective view of drum transport system 150. Specifically, both sets of horizontal bars 170, including top bars 172 and bottom bars 174, and both middle bars 178 are shown. In the embodiment shown, hydraulic cylinders 154 include a first cylinder 190 and a second cylinder 192 which are mechanically connected using a plate 194. Also included is a center cylinder 196. Center cylinder 196 is utilized to move middle bars 176 relative to top and bottom bars 172 and 174 respectively, so that hinge doors 178 are opened or closed based on a connection of middle bars 176 to tie rods 180. An open hinge door 178 is one that is substantially parallel to top and bottom bars 172 and 174 and a closed door 178 is substantially perpendicular to bars 172 and 174. Cylinders 190, 192 are utilized to move top bars 172, middle bars 176, and bottom bars 174, a set of bars 172, 176, 174 being on each side of processing tunnel 20. Plate 194 ensures that each set of a top bar 172 and a bottom bar 174 move in unison. A drum lift surface 152 lifts drum 12 into pyrolysis chamber 22, and further provides a sealing function for chamber 22. Walls of chamber 22 are shown as transparent for clarity. In addition a surface along which drums 12 and 158 are moved is not shown, again for clarity.

The above described drum transport device 150 is utilized for transporting drums 12 and 158 of material through a processing tunnel 20 (shown in FIGS. 1, 3, and 4) for the purpose of treating the material in or on drums 12 and 158 to the conditions inside processing tunnel 20. In a specific embodiment, device 150 is utilized for transporting drums 12 and 158 of waste through an externally heated pyrolysis tunnel in order to pyrolyze the waste in or on drums 12 and 158. A sequence of drum transport device 150 operation is shown in FIGS. 9 through 12.

Figure 9:
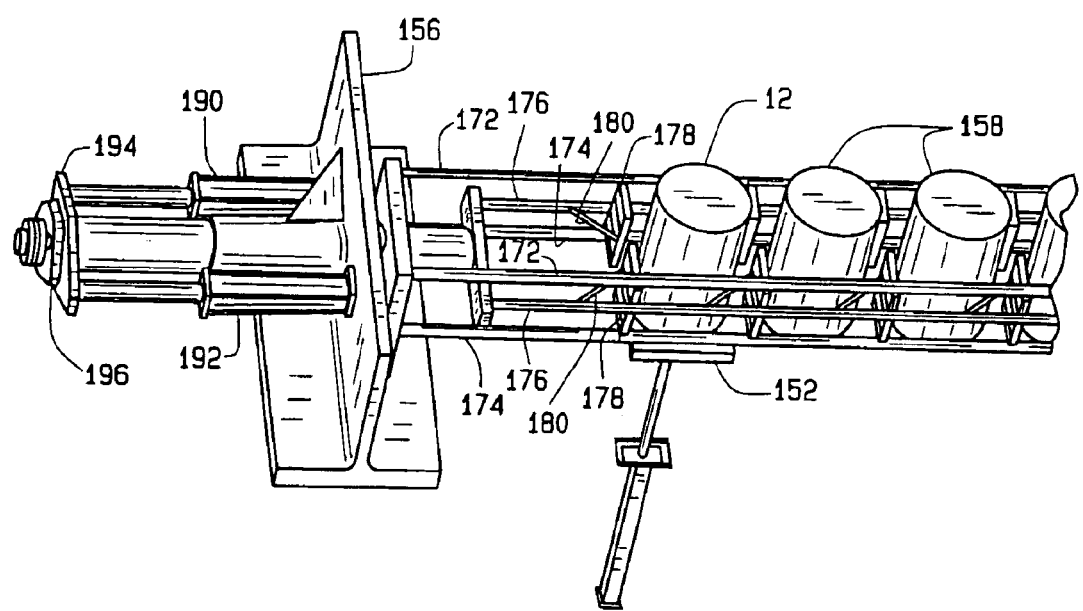
FIG. 9 illustrates movement of a drum off a drum lift surface utilizing the drum transport device.

FIG. 9 illustrates movement of a drum 12 off drum lift surface 58 utilizing drum transport device 150. A new drum 12 is lifted up into drum transport device 150 utilizing drum lift surface 152. Hinge doors 178 are closed, and device 150 is positioned for removal of drum 12 from lift device 152.

Figure 10:
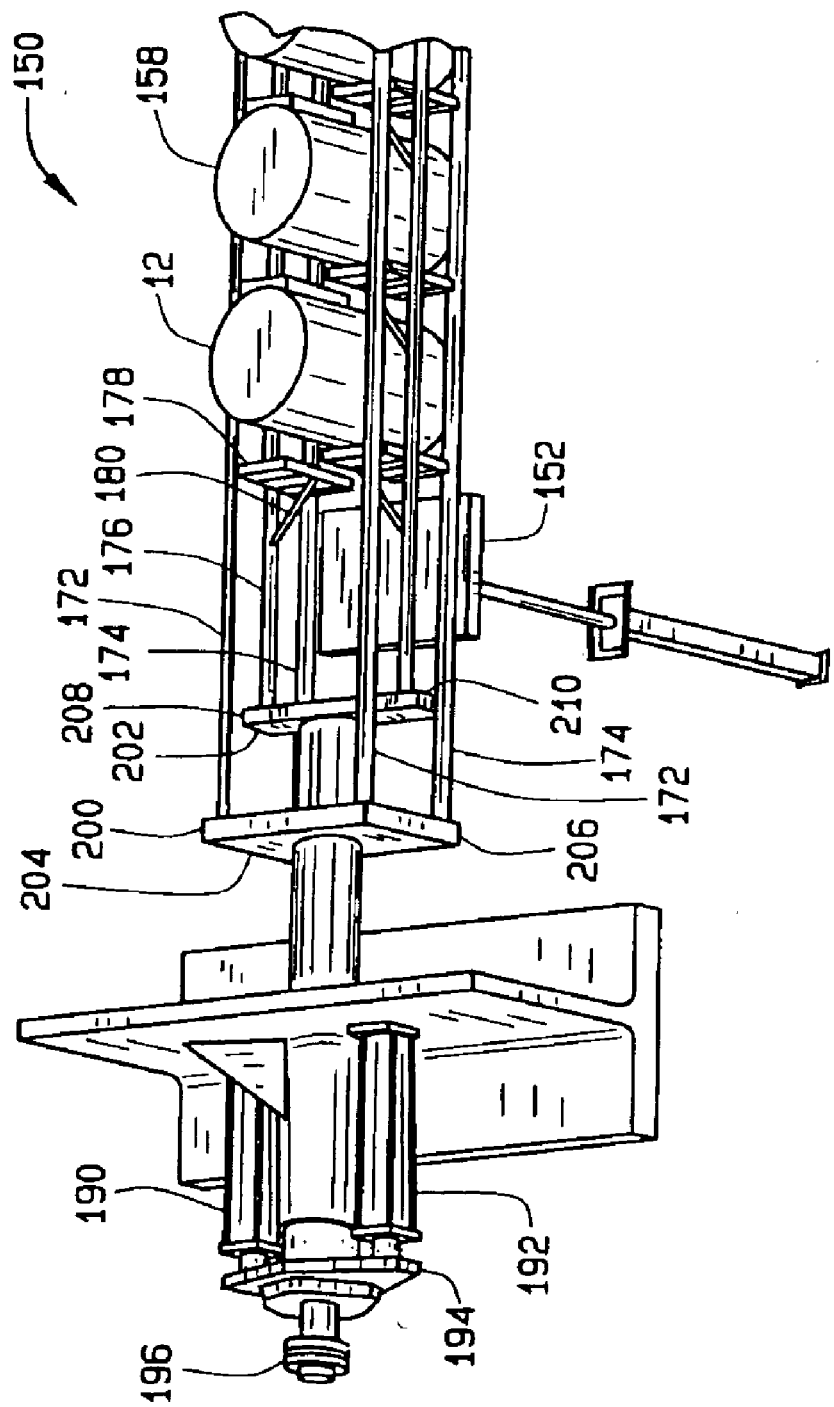
FIG. 10 illustrates continued movement of drums utilizing the drum transport device.

FIG. 10 illustrates continued movement of drums 12 and 158 utilizing drum transport device 150. Top bars 172, bottom bars 174 and middle bars 176 are moved to the right (as shown in the Figures) by actuating cylinders 190, 192, and 196 to transport the line of drums 12 and 158 to the right, with drum 12 being moved from drum lift surface 152. Ends of top bars 172 and bottom bars 174 are attached to a first plate 200, which in turn is connected to cylinders 190 and 192 and middle bars 176 are connected to a second plate 202, which in turn is connected to cylinder 196. Specifically, one top bar 172 and one bottom bar 174 are attached near a first side 204 of first plate 200 and one top bar 172 and one bottom bar 174 are attached near a second side 206 of first plate 200. Further, one middle bar 176 is attached near a first side 208 of second plate 202 and one middle bar 176 is attached near a second side 210 of second plate 202.

Cylinders 190, 192 and 196, together with plate 194, first plate 200 and second plate 202 are utilized to move bars 172 and 174 in unison with bars 176, based on a travel of cylinder 196 and second plate 202 with respect to a travel of cylinders 190 and 192 and first plate 200. Cylinder 196 and second plate 202 may also move independent of cylinders 190 and 192 and first plate 200, to move bars 176 independently of bars 172 and 174, which causes hinge doors 178 to open and close, utilizing tie rods 180, which are needed for engaging drums 12 and 158.

Figure 11:
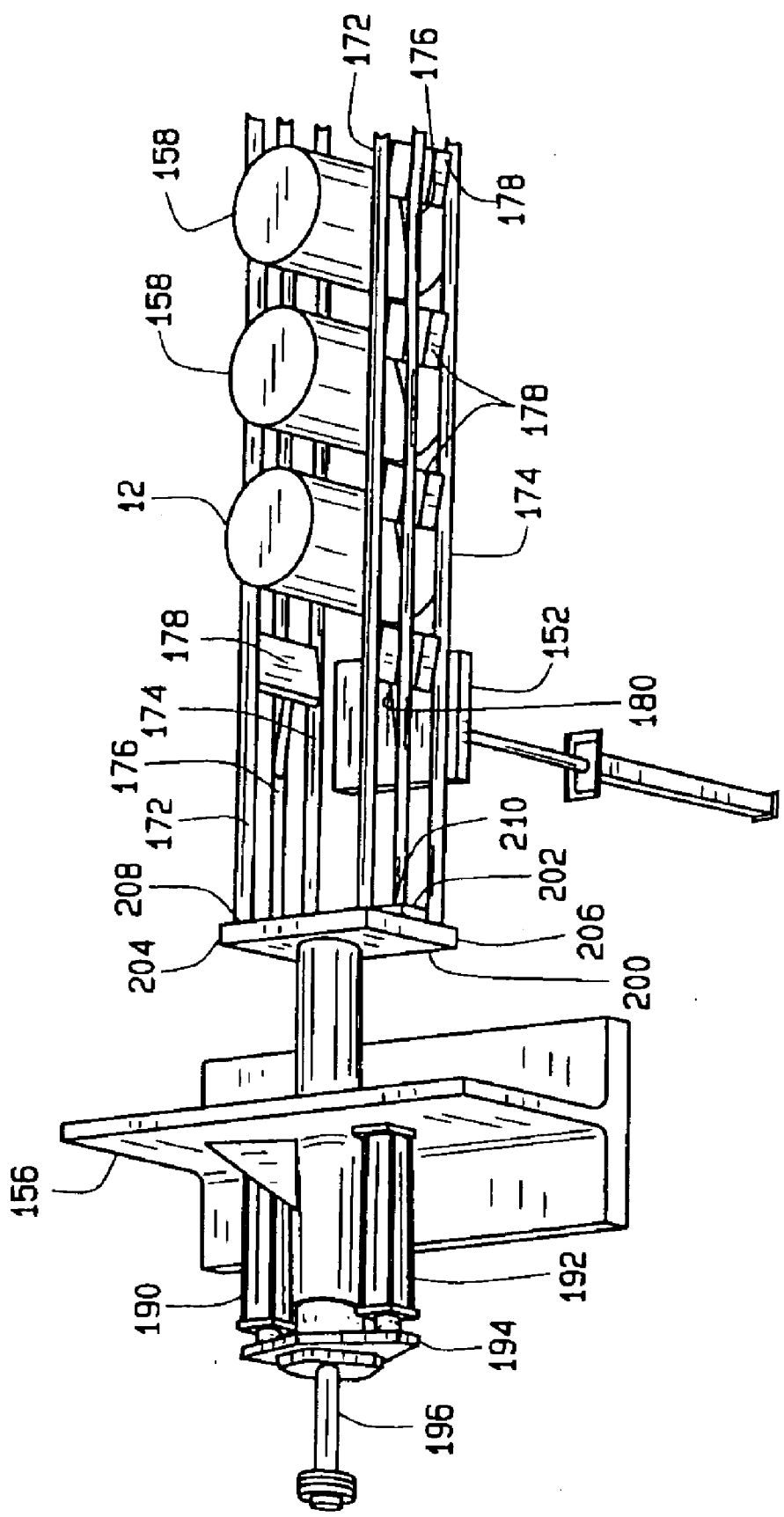
FIG. 11 illustrates retraction of the drum transport device.
Figure 12:
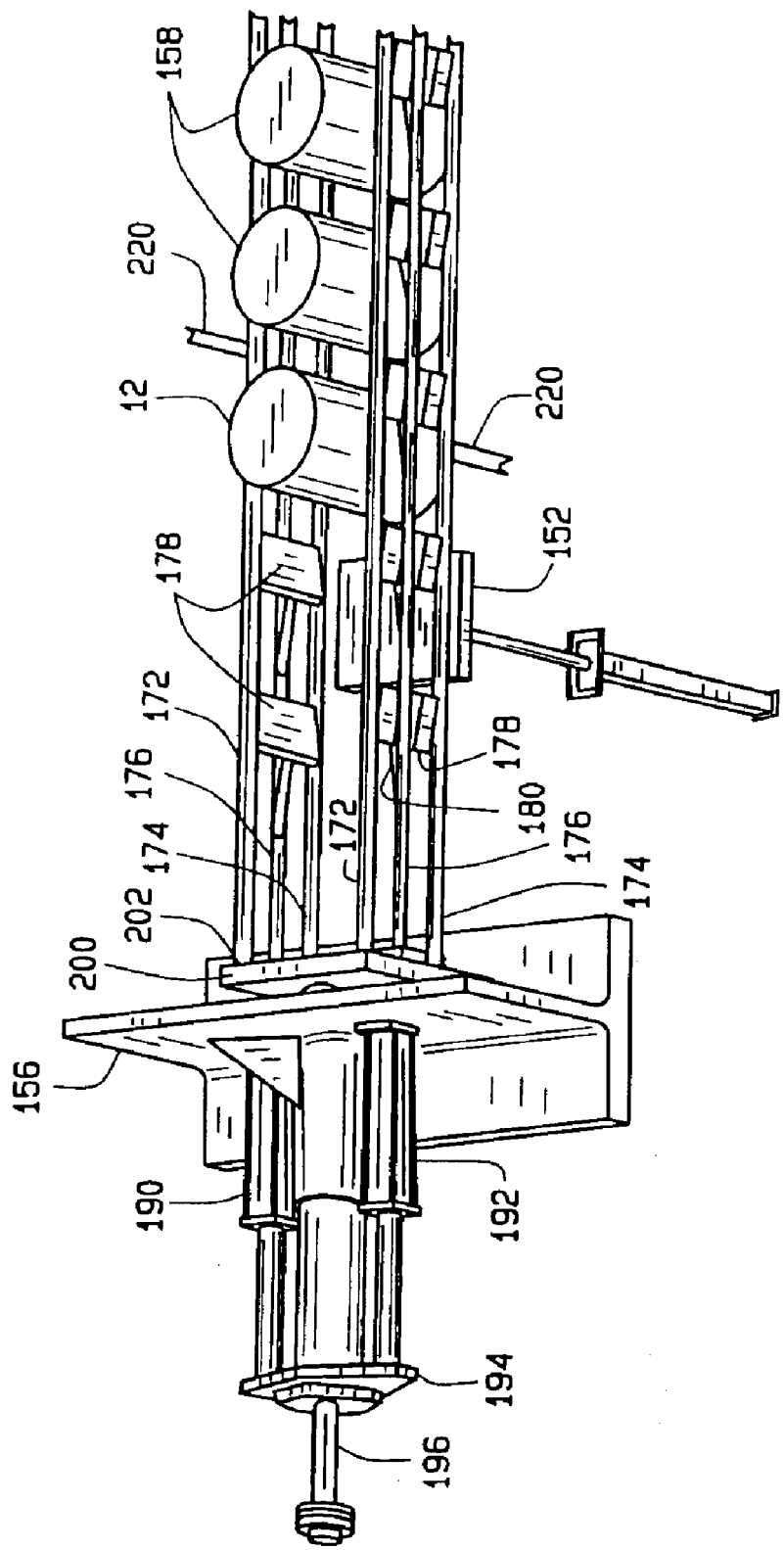
FIG. 12 illustrates a retracted drum transport device prepared to receive a new drum from drum lift surface.

FIG. 11 illustrates hinge doors 178 in an open position. Hinge doors 178 are opened as hydraulic cylinder 196 is retracted with respect to cylinders 190 and 192, which causes second plate 202 to move to a position adjacent to first plate 200. As described above, such movement causes middle bars 176 to move with respect to tops bars 172 and bottom bars 174, causing an operation of tie rods 180, and a pivoting of hinge doors 178 to the open position. Now referring to FIG. 12, all bars 172, 174, and 176 are retracted to the left (as shown in the Figure), by actuating all of hydraulic cylinders 190, 192, and 196, leaving the row of drums 12 and 158 stationary. As shown in FIG. 12, hinge doors 178 are now in a position to be closed, and further in a position to engage a new drum (not shown) that is to be brought up on drum lift surface 152. After a new drum 12 is brought up, a drum transport cycle can be repeated, as shown through FIGS. 6–12.

In one embodiment, drum transport device 150 automatically compensates for thermal expansion within device 150, and is unaffected by dusty, corrosive and high temperature environments which are encountered in the pyrolysis tunnel 20. Further, in an alternative embodiment, drum transport device 150 allows easy loading of drums 12 using drum lift surface 152 from either of above or below device 150, since the space between sets of bars 172, 174, and 176 is open. Further, loading drums 12 into drum transport device 150 allows for a smaller loading area volume as compared to known drum transport mechanisms. A smaller loading area volume is thought to minimize pyrolysis chamber operational problems which are associated with pyrolysis gas condensation. Further, and as described above, drum lift platform 152, used to raise drums 12 into drum transport device 150, also serves as a seal for pyrolysis chamber 22 (shown in FIG. 7). Such simple and effective loading and sealing is not known to exist with other transport systems.

In addition, drum transport device 150 is constructed in such a way as to easily apply large horizontal forces to a top, a bottom and a middle of drums 12 and 158 during transport ensuring a positive, tip-free movement. Another advantage of device 150 is that hinge doors 178 can be utilized to scrape walls (not shown) of pyrolysis chamber 20 during the back and forth operation above described. In an alternative embodiment, wall scrapers 220 (only two shown) are connected to top bars 172 and bottom bars 174 and are utilized to keep walls of chamber 20 relatively debris free. Still another advantage of drum transport device 150 is that dust accumulation on a floor of pyrolysis chamber 20 is swept toward an outlet (not shown) since drums 12 and 158 sit on the floor of chamber 20. Movement of drums 12 and 158 help keep the floor of chamber 20 clean, and a good heat transfer is maintained between the floor and bottoms of drums 12 and 158. In transport mechanisms which utilize transport devices such as rollers, accumulation on the floor degrades heat transfer to drums 12 and 158 and can eventually cause a failure within the transport device.

Further advantages of drum transport device 150 as compared to other transport systems, for example, those using continuous belts, chains or cables (i.e. a loop), is that those systems use one segment of the loop to move drums, while the return segment simply takes up space. If such a return segment is located inside a pyrolysis tunnel, the distance between the drums and the wall is diminished to make room for the return segment, and therefore the heat transfer capabilities are diminished. Also these types of transport systems utilize complicated tensioning devices, sprockets, rotating shafts, and other moving parts which are exposed to the dusty, high temperature, corrosive, and erosive atmosphere inside a pyrolysis tunnel. Such devices are believed to be less reliable than the herein described drum transport device 150.

Other transport devices could include a return segment located outside the pyrolysis tunnel, for example, in a separate duct, which must be sealed, heated, gas purged, and dust removal provided for, in order to prevent debilitating accumulation of pyrolysis byproducts. In such transport devices, if the return duct is gas sealed from the pyrolysis tunnel but was not heated, significant thermal cycling would severely reduce reliability of the transporter device. Reliability is reduced when any lower temperature volumes which are in proximity to the pyrolysis tunnel act as a condenser for tars, causing the return duct to quickly plug with tar and char dust. Therefore, construction of a separate duct for the return segment becomes almost as costly and difficult as building the pyrolysis tunnel, and further results in a difficult maintenance situation.

Therefore, a drum transport device 150, as herein described, composed of arranged hydraulic cylinders 190, 192, and 196, and connected to bars 172, 174, and 176, doors 178 and tie rods 180, is capable of moving a row of drums 12 and 158 through a pyrolysis tunnel 20 in either direction at extreme temperatures, in the presence of aggressive gasses, and has a high reliability. Drum transport device 150 automatically compensates for thermal expansion and large even forces are applied to drums 12 and 158 as they are transported.

A closure assembly for use with a gas tight chamber, vessel or duct, for example, pyrolysis chamber 20 is also described. The closure assembly includes a sliding door having grooves therein for insertion of inflatable tubular seals. Additional grooves are included on the door for pressure testing and purging via a pressure source. The closure assembly further includes a frame into which the door is placed, and a linear bearing system allows for movement of the door within the frame. In a particular embodiment, the closure assembly provides a gas tight closure that allows passage of drums of waste material from a standard atmosphere containing air into a single or series of minimum volume chambers where the atmosphere is changed to a non oxygen atmosphere. The closure assembly therefore allows drums of material to pass into and out of a gas and pressure tight chamber so that the atmosphere surrounding the drum can be changed from air to an inert or reactive gas or visa versa. In a specific embodiment, the closure assembly allows for the passing drums of waste into and out of a tunnel type pyrolysis reactor, for example, pyrolysis chamber 20.

Figure 13:
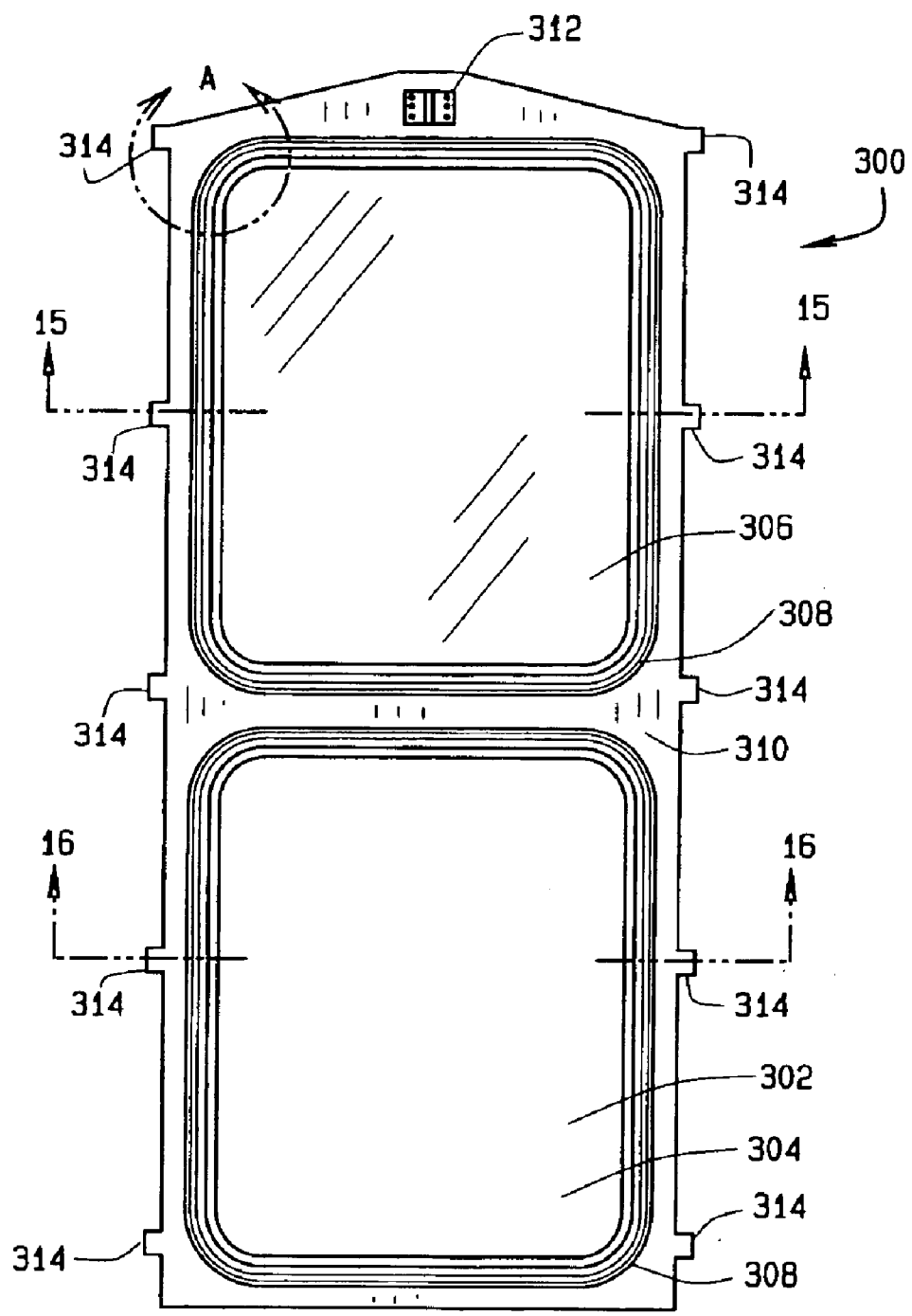
FIG. 13 is a front view of a sliding door.

FIG. 13 is a front view of a sliding door 300. A first portion 302 of door 300 includes a opening 304 therethrough, and a second portion 306 of door 300 is solid. Door 300 also includes three grooves 308 encircling first portion 302 and three grooves 308 encircling second portion 306 of door 300. Grooves 308 are shown in greater detail in subsequent Figures, and grooves 308 encircle an area of first portion 302 slightly larger than opening 304. Grooves encircling portion 306 encircle an area approximately the as those grooves 308 which encircle opening 304. In one embodiment, grooves 308 are machined into a front surface 310 of door 300. In an alternative embodiment, grooves 308 are machined into both front surface and a back surface (not shown) of door 300. Having grooves 308 on both sides of door 300 is believed to extend a useful life of door 300, as door 300 may be rotated 180 degrees and reinserted into a frame, which is described below. It is further believed that periodic rotation of door 300 helps to extend a useful life of door 300 as it may be exposed to caustic environments during use.

Figure 17:
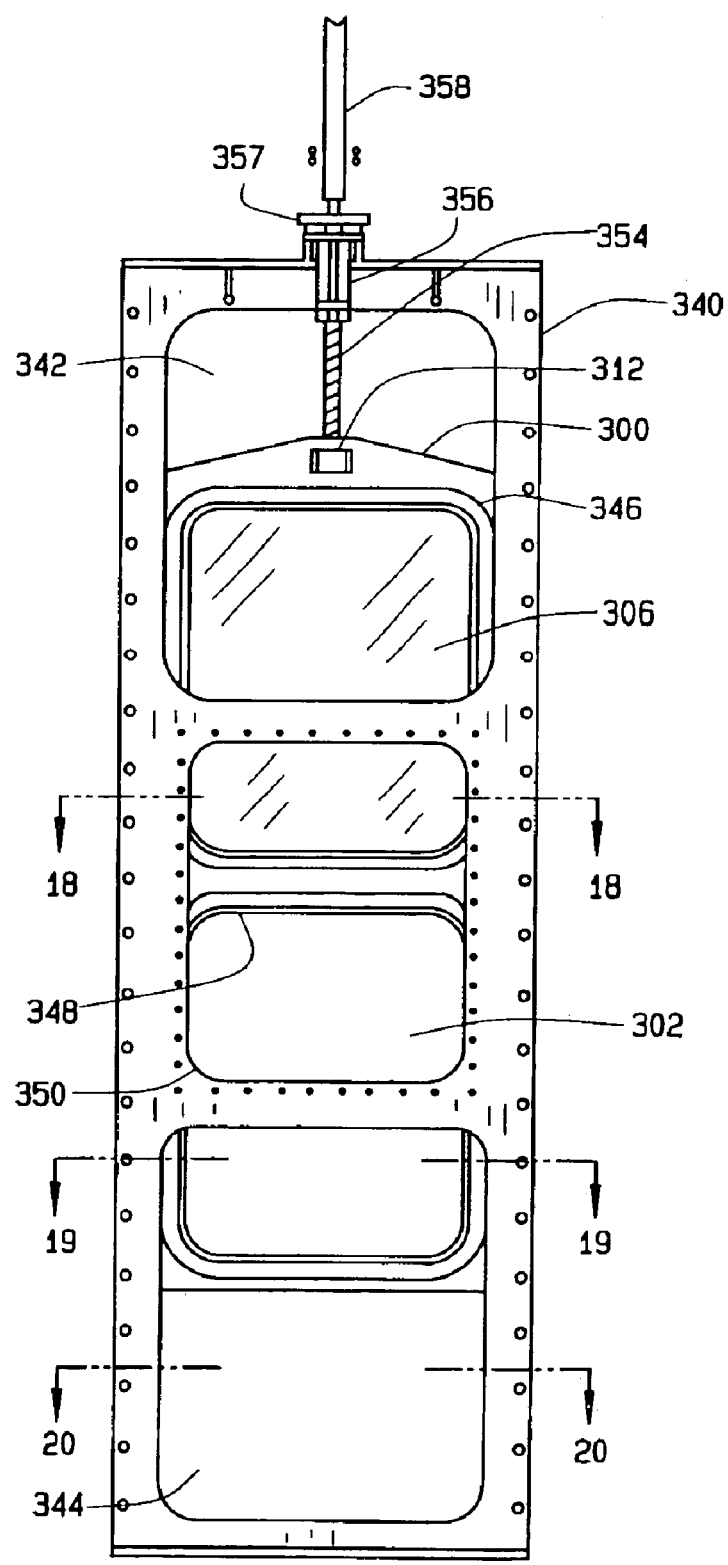
FIG. 17 is a front view of a door within a frame.

Door 300 further includes a connection assembly 312 for an actuating rod (shown in FIG. 17). Further included are rectangular protrusions 314 on each side of door 300. In one embodiment, protrusions 314 are linear bearing holder blocks. Protrusions 314 may be made integral with door 300 but in an alternative embodiment protrusions are made as separate blocks that are attached to door 300 utilizing any of a number of known fastening methods. In one embodiment, an elastomeric material (not shown) is placed between door 300 and protrusions 314. The elastomeric material allows for thermal expansion of door 300, without distortion of the components of the closure assembly.

Figure 14:
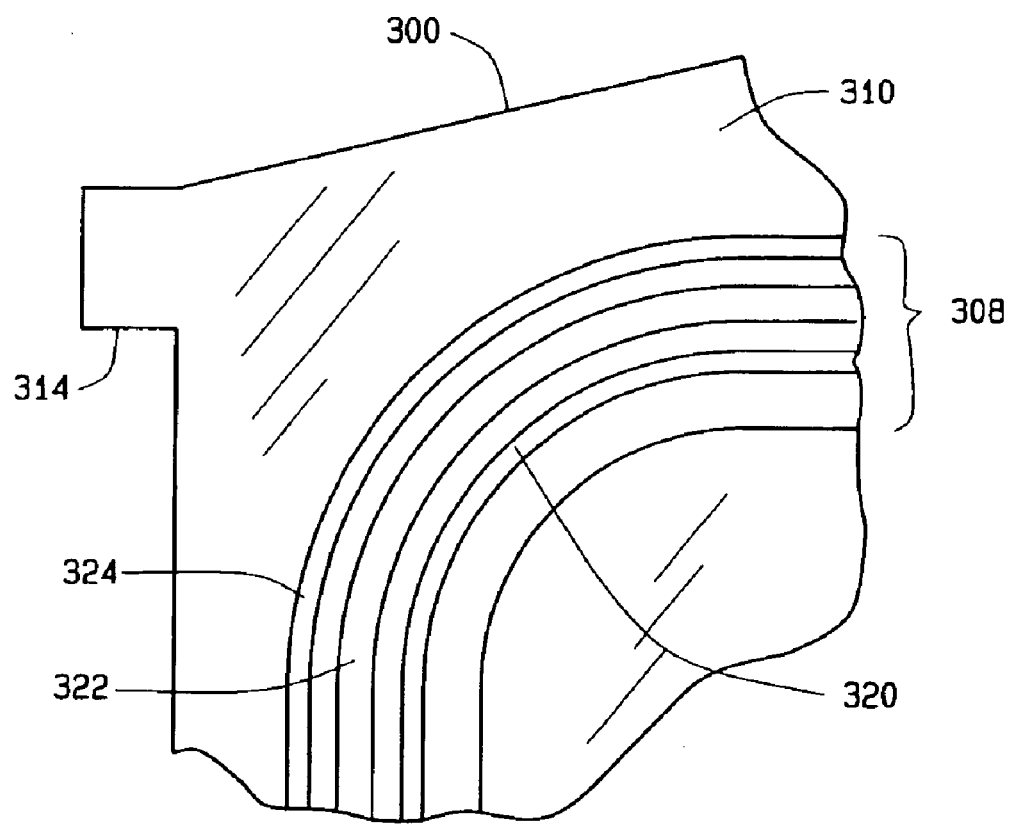
FIG. 14 is a magnified view of a portion of the door shown in FIG. 13.

FIG. 14 is a magnified illustration of a portion of surface 310 of door 300 (denoted as "A" in FIG. 13) in which a specific embodiment of grooves 308 are shown in detail. Grooves 308 include an inner seal groove 320, a pressurization groove 322, and an outer seal groove 324. In one embodiment, inner seal groove 320 and outer seal groove 324 are configured to engage and retain tubular inflatable seals (not shown).

In one embodiment, inner seal groove 320 and outer seal groove 324 are largely open and semi-circular, which allows for ease when machining into a metallic surface, for example, surface 310 of door 300. Inner seal groove 320 and outer seal groove 324 are therefore configured to utilize a circular cross section elastomeric tubing, referred to herein as tubular inflatable seals. In one embodiment, the inflatable seals are simply cut to length, glued together, punched and inserted into seal grooves 320 and 324. As described in further detail below, inflatable seals can be replaced without removing door 300 (shown in FIG. 13) from service, and without removing door 300 from a frame (described below). Therefore, a slowly leaking inflatable seal can be detected and replaced long before damaging conditions occur. In addition, if an inflatable seal fails completely, door 300 can be moved to a position where the failed inflatable seal can be replaced In other words, seals can be easily removed and replaced without removing door 300 from service, whether door 300 is fully open or fully closed. As described above, grooves 320 and 342 for the inflatable seals are simple to fabricate due to the simple cross section, and allow easy removal or insertion of the inflatable seal without special tools or complicated disassembly.

Figure 15:
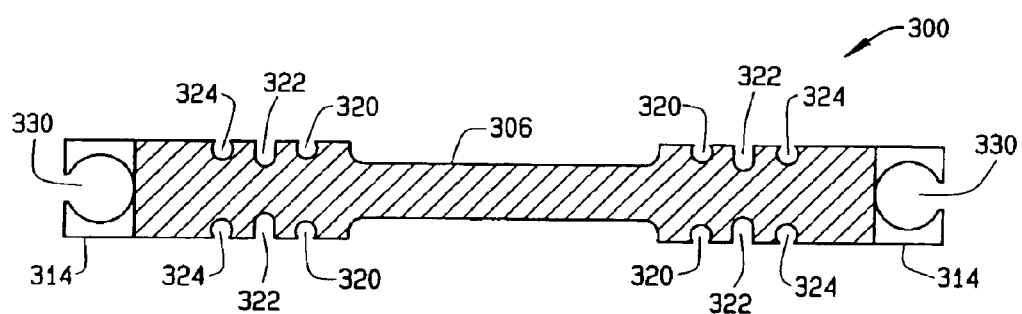
FIG. 15 is a cross sectional view of the door along line 15—15 as shown in FIG. 13.
Figure 16:
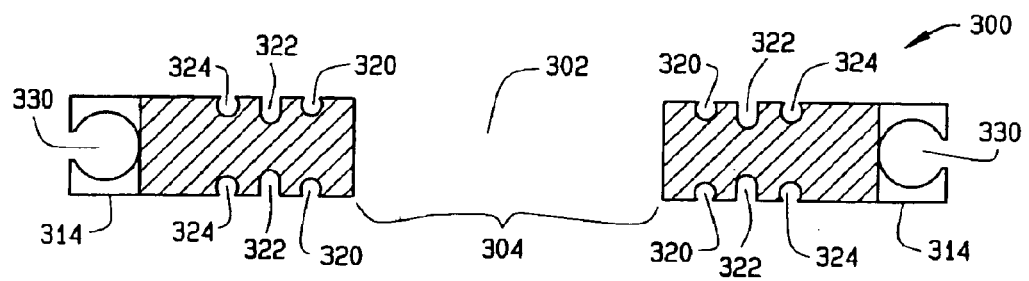
FIG. 16 is a cross sectional view of the door along line 16—16 as shown in FIG. 13.

FIG. 15 is a cross sectional view of door 300 which provides further detail regarding a shape of inner seal groove 320, pressurization groove 322, and outer seal groove 324 which extend around and outside a perimeter of second portion 306 of door 300. Also further detailed are protrusions 314. In the embodiment shown, protrusions 314 include a circular passage 330, which are configured to engage rails of a door frame as further described below. In one embodiment and as described above, protrusions 314 are removable linear bearing holder blocks. FIG. 16 is an additional cross sectional view of door 300 which provides further detail regarding features of door 300, specifically, first portion 302 which is open. As described in FIG. 13, first portion 302 includes a opening 304 which extends through door 300.

FIG. 17 illustrates a front view of door 300, as mounted within a frame 340, the combination referred to herein as a closure assembly. A top opening 342 and a bottom opening 344 within frame 340 provide access to seals 346 and 348 during operation of door 300. Removable covers over openings 342 and 344 are not shown. When door 300 is fully open, that is, first portion 302 of door 300 is aligned with a middle opening 350 within frame 340, seals 348 are inflated, effectively sealing a process while allowing materials to pass through opening 304. At this time, seals 346 around second portion 306 of door 300 can be accessed, removed, and replaced through top opening 342. In a particular application, when first portion 302 of door 300 is aligned with a middle opening 350 within frame 340 drums of material on a roller conveyor line to pass through first portion 302 of door 300 and middle opening 350 of frame 340.

When door is fully closed, that is, second portion 306 of door 300 is aligned with middle opening 350 within frame 340, seals 346 are inflated, effectively sealing a process which occurs on an opposite side of door 300. At this time, seals 348 around first portion 302 of door 300 can be accessed, removed, and replaced through bottom opening 344. To provide the ease for removing and replacing seals 346 and 348, top opening 342 and bottom opening 344 are larger than middle opening 350.

An actuating rod 354 is connected to connection assembly 312 of door 300. In the embodiment shown, actuating rod 354 is a ball screw shaft driven by a motor 356 and a belt drive 357. Actuating rod 354 enables up and down movement of door 300. As actuating rod 354 moves up and down it passes into a sleeve 358. Other embodiments for enabling up and down movement of door 300 are also contemplated, for example, pneumatic or hydraulic cylinders. While described herein as up and down movement of door 300, it is to be understood that the embodiments described herein as also applicable to a door and frame assembly which employs side-to-side movement.

Figure 18:
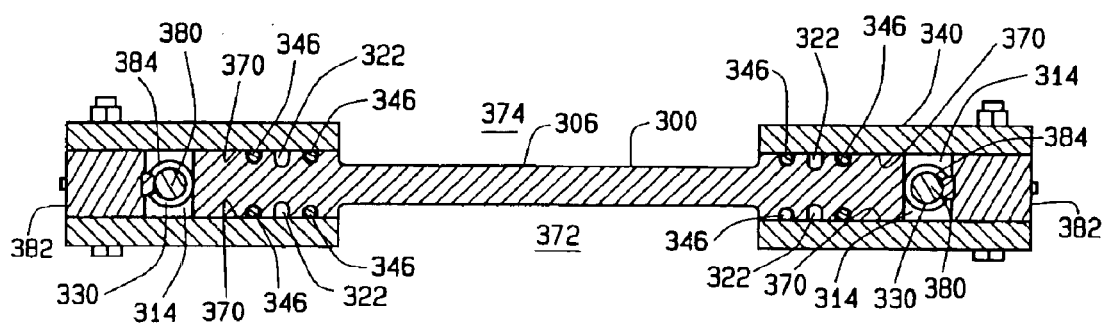
FIG. 18 is a cross sectional view of the door within the frame along line 18—18 as shown in FIG. 17.
Figure 19:
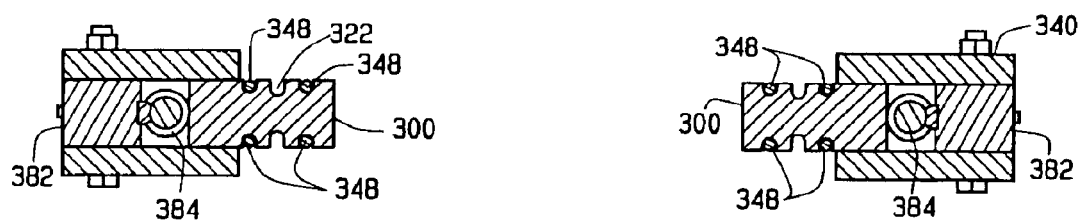
FIG. 19 is a cross sectional view of the door within the frame along line 19—19 as shown in FIG. 17.

FIGS. 18 and 19 are cross sectional views of door 300 within frame 340. Referring to FIG. 18, it is easily seen that when door 300 is in a proper position, inflation of seals 346 provide a seal between door 300 and an inside surface 370 of frame 340. Therefore, when second portion 306 of door 300 is in position, a seal exists between a first side 372 and a second side 374 of door 300 and frame 340. FIG. 18 also shows a rail 380 attached to a side portion 382 of frame 340. Rail 380 engages protrusions 314, sometimes referred to as a bearing holder, within circular opening 330 allowing door 300 to slide up and down on rails 380, which in one embodiment extend the length of frame 340. In the embodiment described above, where sealing grooves 320, 322, and 324 (shown in FIG. 15) are cut into only one side of door 300, inflation of seals 346 on one side of door 300 causes an opposite side of door 300 to engage frame 340. In a particular embodiment, linear bearings 384 are inserted between rails 380 and protrusions 314, to provide a less frictional and more uniform movement to door 300.

Figure 20:
FIG. 20 is a cross sectional view of the frame along line 20—20 as shown in FIG. 17.

FIG. 19 illustrates a portion of door 300 within frame 340 at bottom opening 344. As illustrated in the Figure, a user has access to seals 348 as bottom opening 344 (shown in FIG. 17) is larger than middle opening 350 (shown in FIG. 17). In FIG. 20, a cross section of frame 340 further serves to illustrate bearings 380 and inside surface 370 of frame 340. In one embodiment, protrusions 314 and bearings 380 are sliding parts which are constructed of a low friction material, for example, a plastic. As evidenced by FIGS. 18–20, sealing of door 300 serves to effectively isolate protrusions 314 and bearings 380 from any processes which employ door 300.

Figure 21:
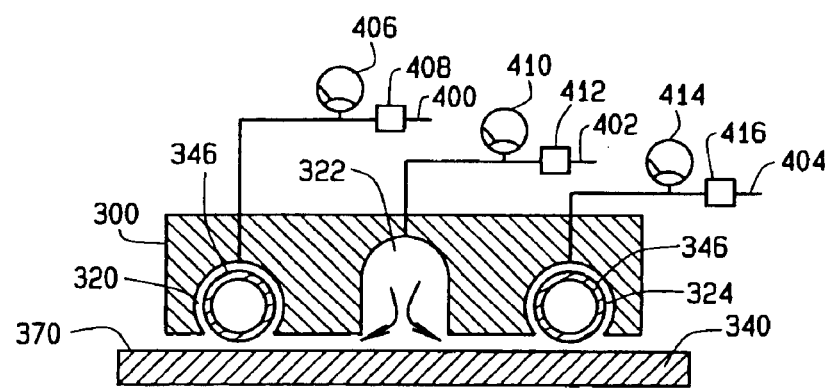
FIG. 21 is a cross sectional view of a portion of a door and a frame, the door having a number of deflated seals.
Figure 22:
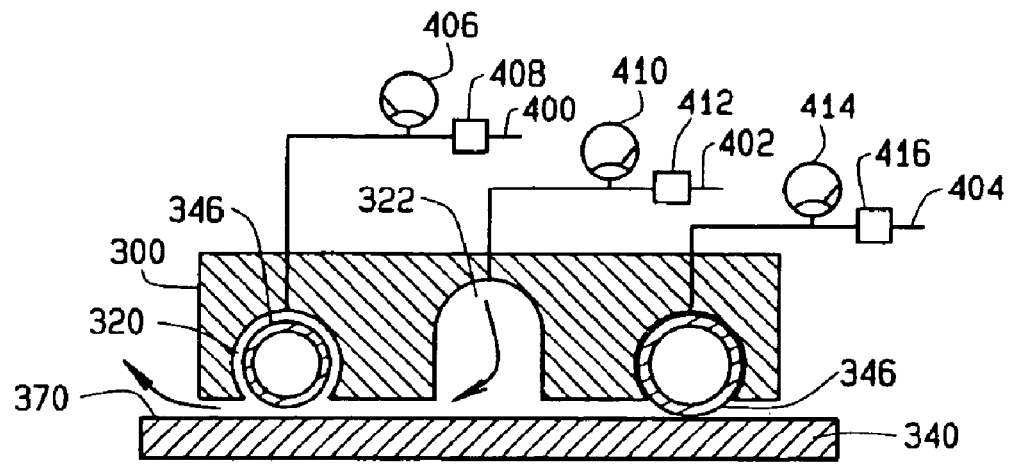
FIG. 22 is a cross sectional view of a portion of a door and a frame, the door having one inflated seal engaging the frame and one deflated seal.
Figure 23:
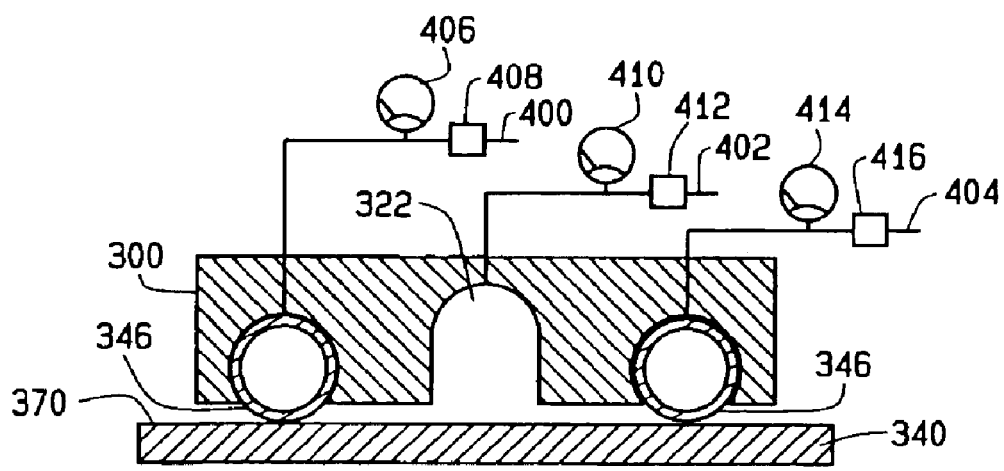
FIG. 23 is a cross sectional view of a portion of a door and a frame, the door having two inflated seals engaging the frame.

FIGS. 21–23 illustrate operation of the above described gas tight seal arrangement by showing a small cross section of one side of door 300 and door frame 340. Elastomeric tubular seals 346 are fit into inner seal groove 320 and outer seal groove 324. Seal 346 within inner seal groove 320 is connected to a pressurization supply line 400, pressurization groove 322 is connected to a pressurization supply line 402, and seal 346 within outer seal groove 324 is connected to a pressurization supply line 404. Pressurization supply line 400 includes a pressure gauge 406 and a flow meter 408. Pressurization supply line 402 includes a pressure gauge 410 and a flow meter 412. Pressurization supply line 404 includes a pressure gauge 414 and a flow meter 416.

FIG. 21 illustrates seals 346 as deflated. Therefore, door 300 is able to slide up and down within frame 340. When seals 346 are deflated, a small purge gas flow from pressurization supply line 402 can be injected to the pressurization groove 322 to keep process debris from sealing areas along inside surface 370 of frame 340. The purge gas flow also helps in keeping bearings 380 (shown in FIG. 20) and protrusions 314 (shown in FIG. 16) clean.

In FIG. 22, door 300 stops moving and is in position for implementation of a sealing process. Seal 346 within outer seal groove 324 is inflated utilizing pressurization supply line 404, and causing a seal with inside surface 370 of frame 340. Continuing purging via pressurization groove 322 prevents process debris accumulation in the seal gas and cleans under and around seal 346 within inner seal groove 320.

In FIG. 23, both seals 346 within inner seal groove 320 and outer seal groove 324 are inflated. At this point, pressure and atmosphere within a process chamber (not shown) can be altered, as the process chamber is sealed off from the other side of door 300. During this time pressure in pressurization groove 322 is monitored with pressure gauge 410 and flowmeter 412 to determine an integrity of seals 346. For example, the process pressure can first be lower by evacuating air from the process chamber, then secondly the process chamber can be pressurized with an inert gas. If the pressure within pressurization groove 322 decreases in the first process step seal 346 within inner seal groove 320 is leaking. A rise in pressure within pressurization groove 322 during the second process step, indicates that gas is leaking past seal 346 within inner seal groove 320.

If during the second process step, a pressure within pressurization groove 322 does not rise, but rather drops, a leak in seal 346 within outer seal groove 324 is indicated. By using this type of pressurization logic, integrity of seals 346 can be determined. In one embodiment (not shown) hollow nipples are screwed into bottoms of inner seal groove 320 and outer seal groove 324. The nipples extend through a preformed hole in the seals 346 and 348 for connecting inflatable seals 346 and 348 to pressurization supplies 400 and 404.

Therefore, and in the embodiment described above, an integrity of seals 346 and 348 (seals 348 not shown in FIGS. 21–23) is monitored by pressurizing and sensing pressure of pressurization groove 322 relative to an inside of a chamber or relative to an outside of the chamber, thus allowing a user to know if and how much one or the other of seals 346 and 348 are leaking.

The above described closure assembly, in one embodiment, provides a minimum distance between the two sides of door 300, through opening 304. This arrangement allows roller conveyors to be placed on both sides of opening 304 such that a box, container or a drum of material can be passed through opening 304 without risk of tilting into a gap between conveyors, and created by the opening of the closure assembly. The closure assembly further allows small clearances to be easily maintained between frame 340 and door 300 due to the arrangement of protrusions 314 and bearings 380, which allows minimal deformation of seals 346 and 348 during inflation and deflation. The arrangement has benefits including keeping seals 346 and 348 from blowing out and extending a life of seals 346 and 348.

Sealing surfaces, for example, seals 346 and 348 which contact inside surface 370 of frame 340 and are exceptionally long lasting since they only make contact when door 300 is not in motion. In addition, in a typical operation, only half of door 300 is exposed to process conditions at any given time such that the unexposed half can be cleaned, heated or cooled relative to the process. The above described configuration of the closure assembly further allows for fast opening and closing since there is no contact between surfaces of seals 346 and 348 and frame 340 during operation.

Figure 24:
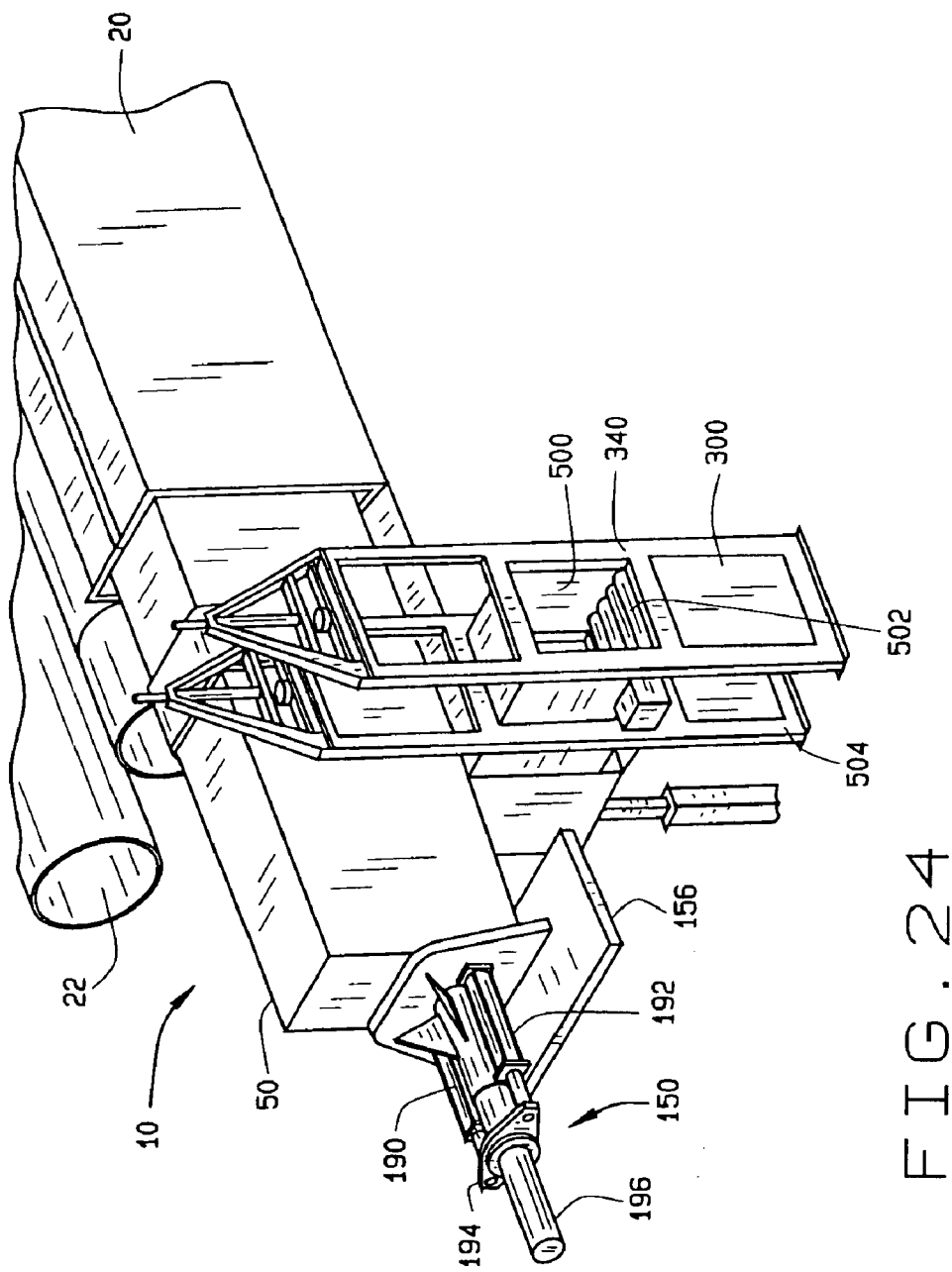
FIG. 24 is a perspective view of a drum pyrolysis system utilizing the drum transport device of FIGS. 6–12 and the gas tight door of FIGS. 13–23.

FIG. 24 is a perspective view of drum pyrolysis system 10 utilizing drum transport device 150 (shown in FIGS. 6–12) and gas tight door 300 and frame 340 (shown in FIGS. 13–23). Drums 12 (not shown in FIG. 24) are loaded into opening 500, which utilizes a conveyor system 502. Once a drum 12 is loaded door 300 is activated (as described above) and is utilized to seal opening 500. Once the seal is complete, pyrolysis system 10 acts to evacuate air from the atmosphere surrounding drum 12. Drum 12 moves through a second door frame 504 (similar to frame 340) and onto drum lifting surface 152. Frame 504 incorporates a door 300, as described above, to provide a further seal for pyrolysis chamber 20. Drum 12 is lifted into inlet box 50 where it is engaged by drum transport device 150. Drum transport device 150 then moves drum 12 to from inlet box 50 into and through pyrolysis chamber 20, as previously described. Devices similar to door 300, frame 340, and drum lifting surface 152 are utilized to remove drums 12 at an end of the pyrolysis process.

FIG. 25 illustrates another embodiment of pyrolysis system 10 utilizing the gas tight door of FIGS. 13–23. Functionally, the systems of FIGS. 24 and 25 are similar. However, the system of FIG. 25 is configured so that drums 12 are loaded into pyrolysis chamber 20 from the side (similar to the system shown in FIG. 5), rather than from below (as shown in FIG. 24). Drums 12 are loaded into opening 550, which utilizes a conveyor system 552. Once a drum 12 is loaded door 300 is activated (as described above) and is utilized to seal opening 550. Drum 12 is then moved into inlet box 50. Frame 554 incorporates a door 300, as described above, to provide a further seal for inlet box 50. Drums 12 are moved through chamber 20 utilizing well known conveyance mechanisms.

The pyrolysis process described herein further provides separation of halogens from the waste stream, by adding cement kiln dust to the top of drums 12 before pyrolysis begins. Halogen salts are then dissolved from an aqueous char/ash solution and recovered. This pyrolysis process also allows economic separation of heavy metals from waste and results in emission reductions due to a cleaner and better-controlled burn. A higher recycling efficiency is also attained, with a smoother and more controlled kiln operation than other waste using cement kiln processes. Further, desired objectives for a cement making process are met as the process described herein utilizes a fuel/raw material stream that is homogeneous, can be safely stored in large silos or bins, is easy to transport, can provide a reliable raw material component for making cement, does not contain significant amounts of metals, and does not lead to reducing conditions in the clinkering zone.

In pyrolysis system 10, cold waste liquid is isolated in drums 12 until it is evaporated in pyrolysis chamber 20, and therefore does not come in contact with any parts of pyrolysis chamber 20. In known pyrolysis devices, contact between the waste and the pyrolysis chamber causes deleterious thermal stresses and incomplete pyrolysis. For example, waste liquid in direct contact with the heated wall of the pyrolysis chamber causes thermal stressing of the heat transfer surfaces resulting in premature metal failure. While in most pyrolysis chambers, the walls of the chamber are at a high temperature and in an expanded condition, the localized area of the wall in contact with the liquid is much colder, and shrinks. In pyrolysis system 10, such stresses are limited to steel drums 12. The known pyrolysis systems also allow a free liquid flow of the melted waste material to an inlet or outlet without being vaporized, which results in incomplete pyrolysis. The resulting char/ash product of these known pyrolysis systems therefore can contain volatile components. Such incomplete pyrolysis renders the char/ash non-flowable, sticky, odorous, and a flammability liability. Liquids and melted waste in drums 12 are confined inside the drums, so the liquids and waste cannot get ahead of the normal progression of the drums. The disclosed method and system therefore ensures that all volatile components are vaporized by the time drums 12 reach outlet 58.

The pyrolysis process described herein also provides offers environmental and industrial improvement over land filling or incineration of waste materials. While many pyrolysis processes have been developed, none of these are ideally suited to produce cement kiln fuel/raw material, and none use the waste heat and low oxygen exhaust gas available from a cement making process. Prior devices are not suitable for accepting non-preprocessed solid waste drums and do not process in a way that results in a reliable raw material for making cement. The herein described pyrolysis system provides a significant advancement as a method and apparatus that can use excess heat energy from a cement kiln to pyrolyze solid waste is described. The pyrolysis system produces a raw material and fuel for the cement process that can be safely stored in large silos, is easy to transport, and that produces a clean metals stream ready for recycling.

While the invention has been described in terms of various specific embodiments, those skilled in the art will recognize that the invention can be practiced with modification within the spirit and scope of the claims.

What is claimed is:

1. A pyrolysis chamber comprising:
   a rectangular metallic duct;
   at least one hot air jacket section surrounding said metallic duct;
   a heat transfer source which utilizes exhaust gases from a cement kiln to externally heat an area between said duct and said jacket sections;
   an exhaust for pyrolysis gases created in said chamber, said exhaust configured to provide heat to the cement kiln; and
   a drum transport device for transporting a row of drums of waste material through said pyrolysis chamber, said drum transport device configured to push or pull the drums through said metallic duct, said drum transport device comprising:
   a plate;
   a first pair of connected and vertically spaced horizontal bars on a first side of the row of drums, said bars comprising an end;
   a second pair of connected and vertically spaced horizontal bars on an opposite side of the row of drums, said bars comprising an end, said ends of said first pair and said ends of said second pair being connected to said plate:
   a plurality of middle horizontal bars, one said middle horizontal bar between said first pair, one said middle horizontal bar between said second pair, said middle horizontal bars configured to move in unison with one another, and further configured to move relative to said first pair and said second pair of bars;
   a plurality of vertically oriented hinge doors, a first plurality pivotably connected to said first pair of horizontal bars, a second plurality pivotably connected to said second pair of horizontal bars; and
   a plurality of tie rods pivotably connected at a first end to said hinge doors and pivotably connected at a second end to a corresponding said middle horizontal bar, such that when said middle bar is moved relative to said first pair and said second pair of horizontal bars, said hinge doors swing to a position substantially parallel to said bars or substantially perpendicular to said bars.

2. A pyrolysis chamber according to claim 1, wherein said drum transport device comprises a plurality of hydraulic cylinders axially positioned with said bars, one of said hydraulic cylinders configured to move said middle horizontal bars relative to said first pair and said second pair of connected and vertically spaced horizontal bars, causing said hinge doors to open or close.

3. A pyrolysis chamber according to claim 2, wherein at least one of said plurality of hydraulic cylinders is configured to move said plate, thereby moving said first pair and said second pair of connected and vertically spaced horizontal bars.

4. A pyrolysis chamber according to claim 2, wherein said drum transport device comprises a second plate to which said middle horizontal bars are connected, said hydraulic cylinder connected to said second plate.

5. A pyrolysis chamber comprising:
   a rectangular metallic duct;
   at least one hot air jacket section surrounding said metallic duct;
   a heat transfer source which utilizes exhaust gases from a cement kiln to externally heat an area between said duct and said jacket sections;
   an exhaust for pyrolysis gases created in said chamber, said exhaust configured to provide heat to the cement kiln; and
   a drum transport device for transporting a row of drums of waste material through said pyrolysis chamber, said drum transport device configured to push or pull the drums through said metallic duct, wherein said drum transport device comprises:
   a fixed end plate comprising a plurality of holes therethrough;
   a plurality of hydraulic cylinders mounted to said fixed end plate and configured to operate through said holes;
   a first plate, comprising a first end and a second end, at least one of said hydraulic cylinders connected to said first plate and configured to move said first plate relative to said fixed end plate;
   a second plate, comprising a first end and a second end, said ends corresponding to said ends of said first plate, at least one other of said hydraulic cylinders connected to said second plate and configured to move said second plate relative to said fixed end plate and said first plate;
   a first pair of vertically spaced horizontal bars attached to said first end of said first plate;
   a second pair of vertically spaced horizontal bars attached to said second end of said first plate;

a first middle horizontal bar, said first middle horizontal bar between said first pair of vertically spaced horizontal bars and attached to said first end of said second plate;

a second middle horizontal bar, said second middle horizontal bar between said second pair of vertically spaced horizontal bars and attached to said second end of said second plate;

a plurality of vertically oriented hinge doors, a first plurality pivotably connected to said first pair of vertically spaced horizontal bars, a second plurality pivotably connected to said second pair of vertically spaced horizontal bars; and a plurality of tie rods pivotably between said hinge doors and a respective said middle horizontal bar, such that when said second plate is moved relative to said first plate, said hinge doors swing to a position substantially parallel to said bars or substantially parallel to said bars.

6. A method for moving drums along through a pyrolysis chamber, the chamber having a drum transport device which includes two sets of vertically spaced horizontal bars, one set on each side of a row of drums, plurality of vertically oriented hinge doors, a number of the doors being pivotably connected at intervals to a top and bottom bar of one set of bars, a number of the doors being pivotably connected at intervals to a top and bottom bar of the other set of bars, a plurality of tie rods pivotably connected between the hinge doors and a respective middle horizontal bar, said method comprising:

moving the middle bars with respect to the top and bottom bars such that the hinge doors swing to a position substantially perpendicular to the horizontal bars;

moving the sets of bars in unison, in a first direction, until the doors engage the drums;

moving the sets of bars, and therefore the drums, in the first direction until the drums are in a desired position;

moving the middle bars with respect to the top and bottom bars such that the hinge doors swing to a position substantially parallel to the horizontal bars; and moving the sets of bars in unison in a second direction until a pair of hinge doors are in a position to engage a newly inserted drum upon movement to the substantially perpendicular position.

7. A method according to claim 6, wherein the top and bottom bars are connected to a first plate, and the middle bars are connected to a second plate, wherein said moving the bars in unison comprises moving the first and second plate in unison.

8. A method according to claim 7, wherein said moving the middle bars with respect to the top and bottom bars comprises moving the second plate with respect to the first plate.

9. A method according to claim 8, wherein the first plate and the second plate are connected to separately actuated hydraulic cylinders.

* * * * *